US006755741B1

(12) United States Patent
Rafaeli

(10) Patent No.: US 6,755,741 B1
(45) Date of Patent: Jun. 29, 2004

(54) GAMBLING GAME SYSTEM AND METHOD FOR REMOTELY-LOCATED PLAYERS

(76) Inventor: Yacob Rafaeli, 4 Harav Maimon Street, Bat Yam 59622 (IL)

( * ) Notice: Subject to any disclaimer, the term of this patent is extended or adjusted under 35 U.S.C. 154(b) by 0 days.

(21) Appl. No.: 09/869,763

(22) PCT Filed: Jan. 6, 2000

(86) PCT No.: PCT/IL00/00013

§ 371 (c)(1), (2), (4) Date: Aug. 28, 2001

(87) PCT Pub. No.: WO00/40313

PCT Pub. Date: Jul. 13, 2000

(30) Foreign Application Priority Data

Jan. 7, 1999 (IL) .............................................. 127957

(51) Int. Cl.[7] .............................................. A63F 13/00
(52) U.S. Cl. ............................ 463/25; 463/17; 463/42
(58) Field of Search ............................ 463/16–20, 25, 463/29, 30–34, 40–43; 273/138.1, 143 R; 700/90–91

(56) References Cited

U.S. PATENT DOCUMENTS 3,909,002 A * 9/1975 Levy ......................... 463/26
4,321,673 A 3/1982 Hawwass et al.
4,339,798 A * 7/1982 Hedges et al. .......... 340/323 R
4,357,015 A * 11/1982 Santora et al. .......... 273/142 E
4,467,424 A * 8/1984 Hedges et al. .......... 340/323 R
5,397,133 A * 3/1995 Penzias ................. 273/148 R
5,553,864 A 9/1996 Sitrick
5,674,127 A 10/1997 Horstmann et al.
5,762,552 A 6/1998 Vuong et al.
5,770,533 A 6/1998 Franchi
5,788,573 A 8/1998 Baerlocher et al.
5,820,459 A 10/1998 Acres et al.
5,902,983 A 5/1999 Crevelt et al.
5,967,896 A 10/1999 Jorasch et al.
5,984,780 A 11/1999 Takemoto et al.

FOREIGN PATENT DOCUMENTS

GB 2307184 5/1997
WO WO 99 19027 4/1999

* cited by examiner

*Primary Examiner*—Gene Mancene
*Assistant Examiner*—Patrick Buechner
(74) *Attorney, Agent, or Firm*—Eitan, Pearl, Latzer & Cohen, Zedek, LLP

(57) ABSTRACT

In some embodiments of the present invention a gambling game system is disclosed, comprising a central station including a plurality of betting-type game devices, and an electronic camera for each game device. A plurality of player stations remotely located with respect to the central stations, each one including a monitor for displaying a selected game device at the central station, and input means for selecting a game device and for placing a bet by a player at the player's station relating to an action involving an element of change to occur at the selected game device.

52 Claims, 21 Drawing Sheets

GAMBLING GAME SYSTEM AND METHOD FOR REMOTELY-LOCATED PLAYERS

FIELD AND BACKGROUND OF THE INVENTION

The present invention relates to gambling game systems and methods, and particularly to such systems and methods enabling remotely-located players to participate in the gambling system.

With the increasing use of personal computers by private individuals and the increasing use of the internet communication network, many gambling game systems have been developed and are now in use enabling remotely-located players to play gambling games via the internet. The presently-available systems are virtual systems which desplay, on the player's screen, a simulated or virtual game device, such as a roulette wheel, card table, or slot machine, on which the player may place a bet at the player station. A data processor system "automatically" credits the player for the "wins" and debits the player for the "losses" according to the specific game choice.

However, such known systems, in which the player views on the player's screen a simulated or virtual image of the game device, does not produce the same feeling or excitement as that in a gambling casino, nor does it instill in the player the same confidence in the integrity of the gambling system against the possibility of electronically manipulating the results. In fact, some jurisdictions even outlaw gambling systems involving simulated or virtual images of the game devices because of the possibility of electronically manipulating the results. A further drawback in many of the existing virtual game device systems is that the player must frequently download large quantities of software into the player's computer before the player can even start to play the game.

OBJECT AND BRIEF SUMMARY OF THE INVENTION

A broad object of the present invention is to provide a gambling game system and method having advantages in the above respects.

According to one broad aspect of the present invention, there is provided a gambling game system, comprising: a central station including a plurality of betting-type game devices each involving an element of chance, and an electronic camera for each game device; a plurality of player stations remotely located with respect to the central station, each of the player stations including a monitor for displaying a selected game device at the central station, and input means for selecting a game device and for placing a bet by a player at the player's station relating to an action involving an element of chance to occur at the selected game device; and data processing means for: (a) establishing communication between the central station and each of the player stations; (b) enabling a player at each player station via the input means at the player station to select a game device at the central station, to see via the monitor at the player station what occurs at the selected game device, and to place a bet via the input means at the player station relating to the action involving an element of chance to occur at the selected game device; (c) displaying in the monitor at the player's station the action involving an element of chance as the action occurs at the selected game device; (d) determining whether the action, after it occurs, resulted in a "win" or "loss" of the placed bet; and (e) maintaining a current account for the player in which each win is registered as a credit, and each loss is registered as a debit, according to the rates of the selected game device.

Such a system, preferably utilizes an actual casino as the central station and displays the actual game device to the remotely-located player during the actual playing of the game. Thus, the system in effect moves the player to the casino, or the casino to the player. This increases the feeling and excitement in the remotely-located players of being present in a real gambling casino. It also increases the confidence of the players in the integrity of the system against the possibility of electronical manipulation.

According to further preferred features in the embodiment of the invention described below, the casino also includes a microphone at each game device; and each of the players stations also include a speaker; enabling a player at each player station to hear, as well as to see, what occurs at the selected game device as it occurs at the casino. These features add to the transfer of the gambling casino atmosphere to the remotely-located player's station, and to the confidence of the players in the integrity of the system against the possibility of manipulation.

According to further preferred features in the preferred embodiment of the invention described below, the current account for the player is continuously displayed and updated at the respective player station. In this manner, the player is continuously informed as to the state of the player's account.

Preferably, the plurality of betting-type game devices at the central station include at least one in which the action involving an element of chance to occur at the game device is an action effected by a house person at the central station (casino). Described examples of this type of game include those involving a table, such as a roulette table or card game table, on which the action involving an element of chance is effected by the house person, such as a dealer, at the casino. In such game devices, the casino would preferably also include a display for each game device; and a data processor means would also display at the casino the bet played by each player with respect to each game device, and the current account for each player.

For example, where the game device is for playing a card game, such as black-jack, in which the card table has a player position for each of the players to play the card game, the central station (the casino) would include a camera for imaging each player position of the card table, and a display for displaying the bet and the current account of the player at each player position of the card table; and each player station would include means enabling the player thereat to input commands to the house person at the casino relating to choices made by the player in playing the card game.

Preferably, the player at each player station would use the normal monitor and input means provided in personal computers, which would be programmed, by software downloaded from the system into the player's personal computer, to perform the various display and input functions. In some cases, however, player stations may be provided with an electronic camera selectively energizable by the player at that station for transmitting the player's image to the display of the respective player position at the card table. This feature would add even further to creating the atmosphere of an actual gambling casino.

According to further features in the described preferred embodiment, the table may be a roulette table including a roulette wheel, the roulette table being displayed in the monitor at the respective player station such that the player may place a bet thereon by the input means at the player station.

According to still further features, the plurality of betting-type game devices at the central station the (casino) would include at least one game device in which the action involving an element of chance to occur at the selected game device is an action effected by the player at the player station. Examples of the latter type game devices include slot machines to be activated remotely by the player at the player station, or dice games for dice to be thrown remotely by the player at the player station.

According to still further features in the described preferred embodiment, the data processor means includes a data processor at each player station, a data processor at the casino for each game device thereat, a central data processor for all the game devices at the casino, and a communication system establishing communication between all the data processors. There may be a plurality of such casinos connected together in a network, the data-processor means enabling the player at the player station to select both a particular casino, and a particular game device at the selected casino for placing a bet.

The plurality of player stations may be a different locations connected to the casino or casinos via the internet communication network, telephone lines, closed cable lines, or any other data communication system. It is also contemplated, however, that the plurality of player stations may be at a common location, e.g., at one or more satellite locations of a main gambling casino, remotely located from the main gambling casino but connected thereto by the communication network.

The invention also involves a method of providing gambling services to remotely-located players as described above.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF A PREFERRED EMBODIMENT

Overall System

Figure 1A:
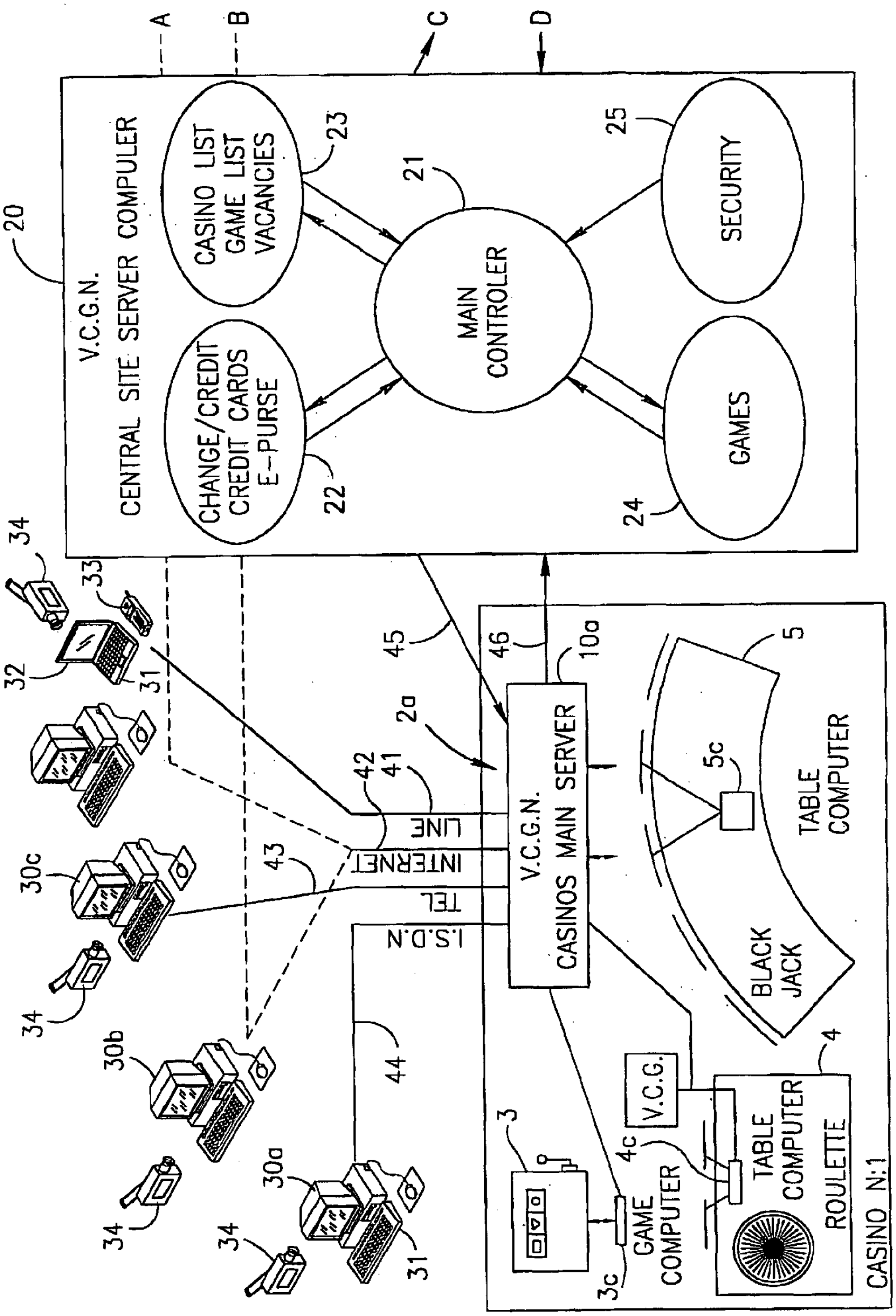
FIGS. 1A and 1B are pictorial illustrations of one form of gambling game system constructed in accordance with the present invention.
Figure 1B:
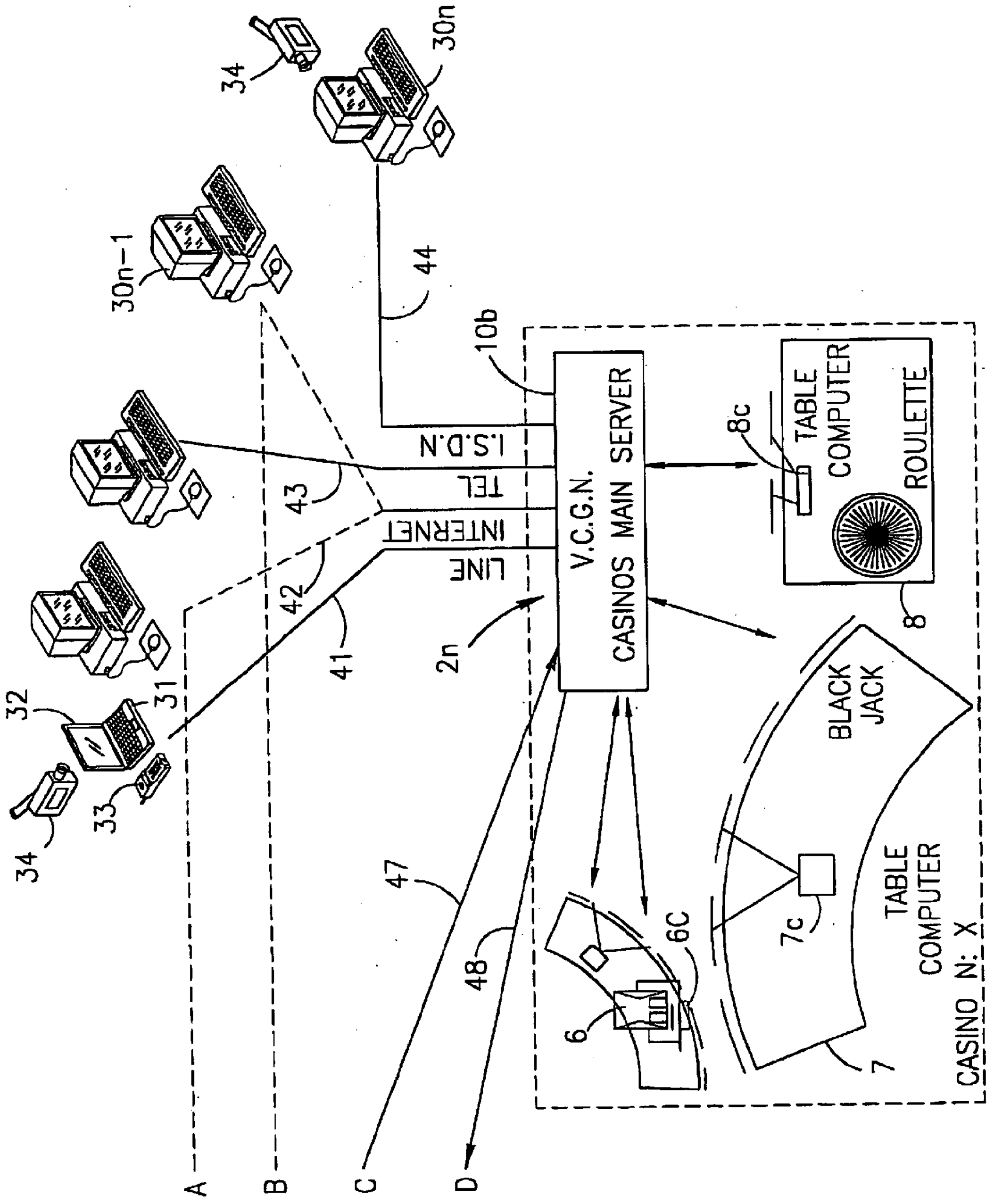

FIG. 1 pictorially illustrates a gambling game system constructed according to the present invention and including a plurality of central stations, 2*a*, 2*n*, each including a plurality of betting-type game devices. For simplification purposes. FIG. 1 illustrates only two central stations 2*a*, 2*n*, and only one of several types of game devices at each central station. Thus, central station 2*a* illustrates a slot machine 3, a roulette table 4, and black-jack table 5, while central station 2*n* illustrates a dice game 6, a black-jack table 7, and a roulette table 8. It will be appreciated that each of the two illustrated central stations 2*a*, 2*n*, would include a large number of slot machines, black-jack tables, roulette wheels, and/or dice tables (and/or other game devices) in order to accommodate a large number of players for each type game device. The central stations 2*a*, 2*n*, could be, and preferably would be, real gambling casinos for receiving the gamblers on their premises, and therefore having the atmosphere of an actual gambling casino.

The present invention, in effect, brings the real casino to remotely-located players, such as may be located in other regions or in other countries, and brings such distant players to the real casino, such as to enable the distant players to experience a close approximation of the same atmosphere as a real gambling casino. As indicated earlier, this not only enhances the players excitement in playing the game devices, but also increases the players confidence in the integrity of the game devices against possible manipulation, as compared, for example, to the currently-known virtual gambling systems.

As further shown in FIG. 1, each of the game devices includes its own computer. Thus, the slot machine 3 includes its computer 3*c*; the roulette table 4 includes its computer 4*c*; the black-jack table 5 includes its computer 5*c*; and so on with respect to the other game devices illustrated in the two casinos 2*a*, 2*b*. Each casino further includes a server for serving the computers of all the game devices at that casino. Thus, casino 2*a* includes server 10*a* serving the computers schematically shown at 3*c*–5*c*, of the game devices at that casino; and casino 2*b* includes a server 10*b* servicing the computers 6*c*–8*c* of the game devices at that casino.

The servers 10*a*, 10*b*, of the casinos 2*a*, 2*b*, communicate with a central site server computer, generally designated 20, which may be located at one of the casinos, or at another location. The central site server computer 20 includes a main controller 21 which processes data regarding all the game devices in all the casinos of the system. FIG. 1 schematically illustrates the data handled by the main controller 21 as including: financial data, indicated by block 22, (e.g., credit cards, E-purses, establishing credit, etc.); casino data, indicated by block 23, (e.g., casino list, game list, vacancies available, etc.); game data, indicated by block 24, (e.g., the rules of each game); and security data, as indicated by block 25, securing all the data handled by the system.

FIG. 1 also illustrates a plurality of player stations, schematically indicated as 30*a*–30*n*, each remotely located with respect to the casinos 2*a*, 2*b*, and each enabling a player to play a selected game device at a selected casino from that remote location. For example, any remote location having a personal computer and access to the internet network or other communication system could play a selected game at a selected one of the casinos. All the player station would require would be a computer modem 31 including a monitor 32 and a telephone 33, having a microphone and speaker. As will be described more particularly below, the monitor 32 is used for displaying, at the respective player station, the selected game at the casino, what occurs there and other information; the microphone within the telephone 33 may be used by the player to transmit messages to a dealer at the selected game device at the casino; and the speaker within the telephone may be used for reproducing at the player station the sound at the selected game device in the casino, including messages by the dealer to the player. If the monitor 32 is a television receiver, the speaker within the receiver can be used for reproducing the sounds and messages from the casino.

The computer 31 at each of the player stations 30*a*–30*n* may communicate with the casino 5 2*a*, 2*b*, either by a direct connection with the casino, or in most cases, via the central site server computer 20. This communication may be by any of the known communication media. FIG. 1 illustrates, for purposes of example, these communication options as including a direct line 41, the internet 42, the telephone line 43, or by an ISDN line 44. FIG. 1 also schematically illustrates the communication between the central site server computer 20 and each of the casinos 2*a*, 2*n* in the network by the internet protocol (IP), via lines 45, 46, 47, 48, respectively.

The Black-Jack Table

Figure 2:
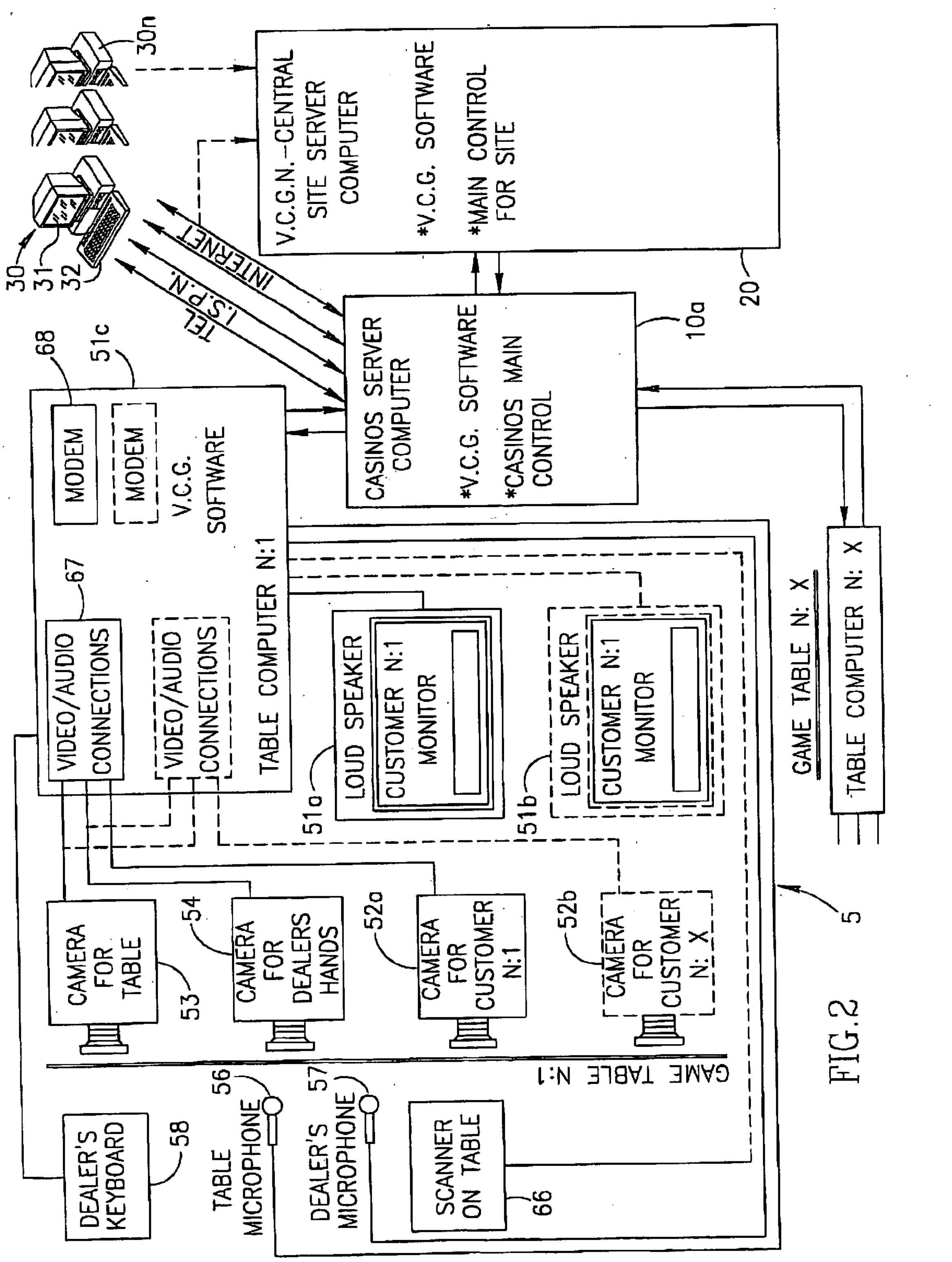
FIG. 2 is a block diagram illustrating a portion of the system of FIG. 1 involved in one game device, e.g., a black-jack table at the central station (an actual casino)
Figure 3:
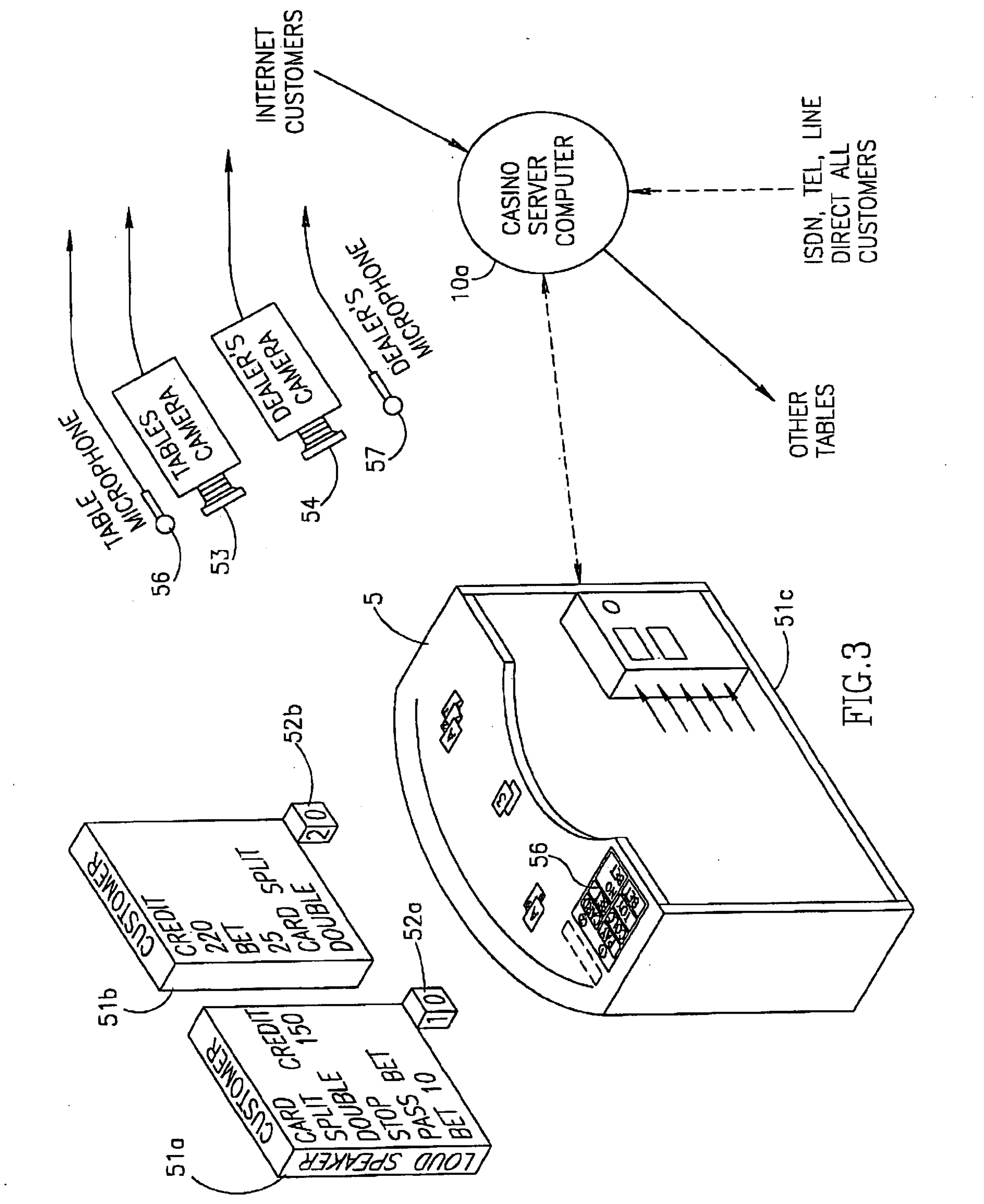
FIG. 3 is a pictorial illustration of a black-jack card table at the casino of FIGS. 1 and 2, including the cameras, microphones and displays thereat.
Figure 4:
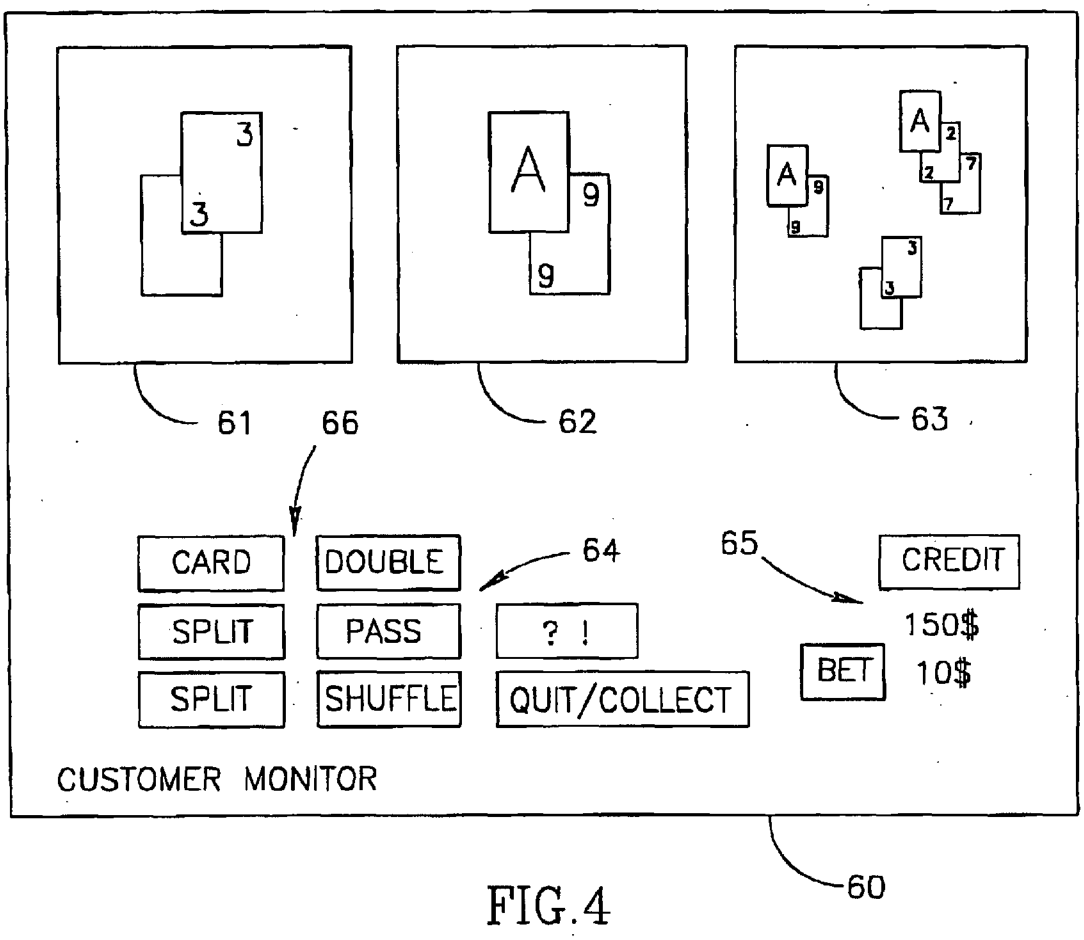
FIG. 4 is a pictorial illustration of the displays and inputs at a player station for remotely playing the game of black-jack at the black-jack card table of FIG. 3.

FIG. 2 is a block diagram illustrating one of the player games at one of the casino stations, in this case the black-jack table 5 at casino 2*a* of FIG. 1. As shown in FIG. 2, black-jack table 5 includes a computer 5*c* connected to the casino main server 10*a*, which is connected to the central site server computer 20. The black-jack table 5 in turn may be connected to any of the player's computers 31 at the remote locations 30*a*–30*n* via communication lines 41–48, as described above with respect to FIG. 1. FIG. 3 pictorially illustrates the black-jack table 5 at the casino, including its displays and cameras; FIG. 4 pictorially illustrates the displays and inputs at each of the player stations 30; and FIG. 5 pictorially illustrates another dealer's keyboard that may be used at the black-jack table in the casino. For purposes of simplifying the description, the black-jack table 5 is shown as including positions for only two players, where in most cases, such black-jack tables accommodate a larger number of player positions.

As shown particularly in FIG. 2 and 3, the black-jack table 5 includes two monitors 51*a*, 51*b*, one for each of the two player positions. Monitors 51*a*, 51*b* display information, as will be described more particularly below, relating to the player at the respective player position of the table. Each player position further includes an electronic camera 52*a*, 52*b*, which is focussed on the portion of the black-jack table 5 allocated to the respective player position.

A further camera 53 is focussed to view the complete black-jack table 5; and a still further camera 54 is focussed on the dealer to view both the dealer and the dealer's cards as played by the dealer.

Each black-jack table 5 is further equipped with a table microphone 56 to pick-up the sounds at the table, in general, and with a dealer microphone 57 to pick up the sounds, (e.g., instructions or messages) made by the dealer.

Each black-jack table 5 further includes a keyboard 58 which may be used by the dealer for inputting certain information, and/or for communicating various messages to the players, as will be described more particularly below with respect to FIG. 5, also illustrating a keyboard but a slightly different construction than keyboard 58 shown in FIG. 3.

FIG. 4 illustrates the monitor generally designated 60, at one of the player stations at a remote location with respect to the casino. Thus, as shown in FIG. 4 monitor 60 includes the following displays: display 61, for displaying the dealer's cards as viewed by the dealer's camera 54; display 62, for displaying the player's card as viewed by the player's camera 52*a*, 52*b* at the respective player position of the black-jack table; and display 63, for displaying all the cards on the table as viewed by the table camera 53.

Monitor 60 further displays a plurality of messages relating to various types of information which can be selected by the player in the course of playing the game. The selection of a message can be effected in any one of the known manners using a monitor screen, e.g., by moving a cursor, via a mouse, to the selected message block and "clicking" the mouse. If selecting a message also involves selecting the amount of a bet, the amount can be selected by the number of "clicks" according to rules and rates supplied to the player in the software.

The messages illustrated for purposes of example in FIG. 4 which may be selected by the player include: "card", asking to receive another card; "stop", asking not to receive another card; "split", to split two of the same cards; "double", to double the cards; "pass", to pass the player's turn; "shuffle", requesting the dealer to shuffle the cards; and "quit/collect", to indicate to the dealer that the player has finished playing and wishes to collect his winnings, if any.

Monitor 60 includes another area, generally designated 65, to display the credit available to the player, which the player must establish beforehand as will be described more particularly below, and also to display the bet made by the player for the respective game. The area 65 of monitor 60 maintains a running account for the respective player, in which each "win" is registered as a credit, and each "non-win" is registered as a debit, according to the rates and rules of the respective black-jack table.

If the game is played with both cards open, the player's cards would be displayed to the player at the remote location by display section 62 of monitor 60. If the game is played with one card covered and one card open, the table would be provided with a scanner, as shown at 66 in FIG. 2, to scan the covered card and to display it to the remote player on section 62 of the monitor.

As also shown in FIG. 2, the table computer 5*c* for black-jack table 5 includes the appropriate video/audio circuitry 67 connected to the various cameras and microphones for the respective player, and also the appropriate modem 68 according to the specific communication medium used between the remotely-located player and the selected game device at the casino. FIG. 2 further shows all the game device of the particular casino being connected to the casino server computer 10*a* and where there a plurality of casinos in the network, all the casino computers being connected to the central site server computer 20.

Figure 5:
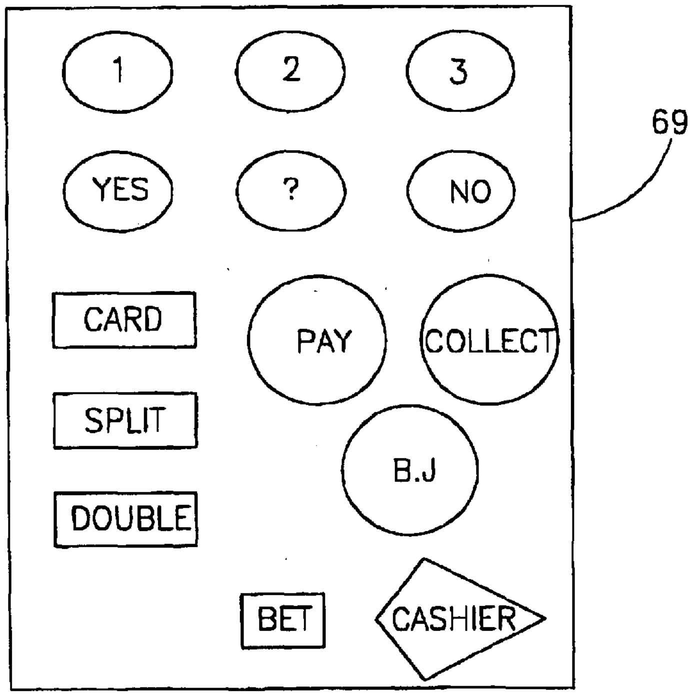
FIG. 5 illustrates another dealer's keyboard for use at the black-jack card table of FIG. 3.

FIG. 5 illustrates another dealer keyboard, generally designated 70, which may be used instead of keyboard 58 in FIG. 3. When keyboard 70 of FIG. 5 is used, the depression of the keys thereon by the dealer would perform the following functions:

TABLE 1

| | | | | | | |
|---|---|---|---|---|---|---|
| Bet | | | | | | PLACE YOUR BET |
| BET | + | No | | | → | NO BET |
| ? | + | BET | + | (1 OR 2 OR 3) | → | DO YOU BET? |
| YES | + | BET | + | (1 OR 2 OR 3) | → | BET ACCEPTED |
| ? | + | CARD | + | (1 OR 2 OR 3) | → | DO YOU WANT A CARD? |
| YES | + | CARD | + | (1 OR 2 OR 3) | → | YOU CAN PULL A CARD |
| NO | + | CARD | + | (1 OR 2 OR 3) | → | YOU CANNOT PULL A CARD |
| ? | + | SPLIT | + | (1 OR 2 OR 3) | → | DO YOU WANT TO SPLIT? |
| YES | + | SPLIT | + | (1 OR 2 OR 3) | → | SPLIT ACCEPTED |
| NO | + | SPLIT | + | (1 OR 2 OR 3) | → | YOU CANNOT SPLIT |
| (1 OR 2 OR 3) | + | ? | + | DOUBLE | → | DO YOU WANT TO DOUBLE? |
| (1 OR 2 OR 3) | + | YES | + | DOUBLE | → | DOUBLE ACCEPTED |
| (1 OR 2 OR 3) | + | NO | + | DOUBLE | → | YOU CANNOT DOUBLE |
| COLLECT | + | (1 OR 2 OR 3) | | | → | INFORM ABOUT LOSS |
| PAY | + | (1 OR 2 OR 3) | | | → | WIN |
| B. J. | + | (1 OR 2 OR 3) | | | → | BLACK-JACK |
| NO | + | PAY = NO | + | COLLECT | → | DICE TIE/DREW |
| ? | | CASHIER | | | | DO YOU WANT TO CHANGE MORE CREDIT |
| CASHIER | | | | | | THANK YOU FOR CHOOSING US AS YOUR CASINO |

The Roulette Table

Figure 6:
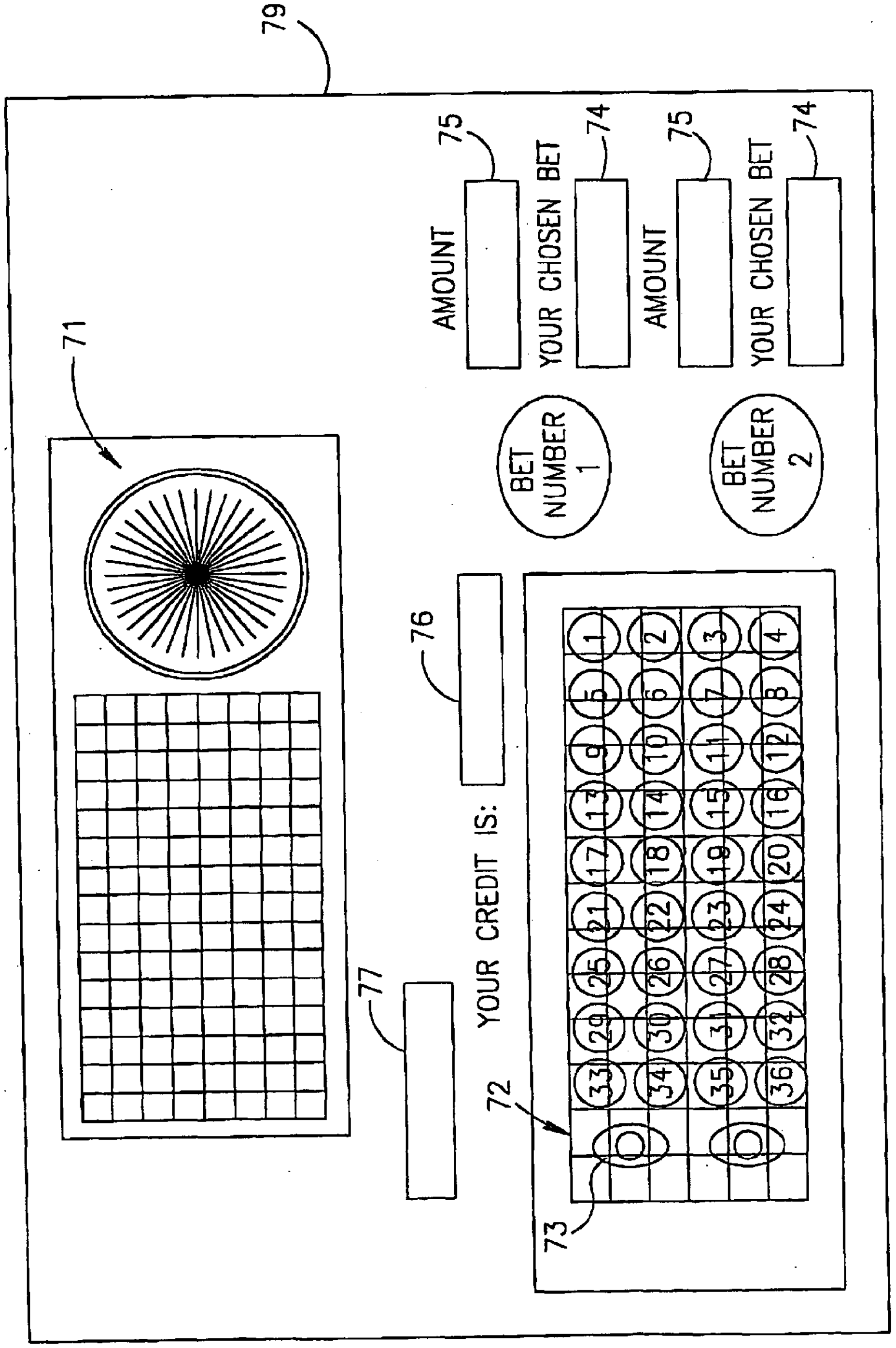
FIG. 6 illustrates a typical display and the inputs at a player's station for playing roulette.

Each roulette table (e.g. 6, 7, FIG. 1) at the selected casino would include the same cameras and microphones for each player position as described above for the black-jack table illustrated in FIGS. 2 and 4, except that the table would be a roulette table instead of a card table, and would include a roulette wheel as schematically shown in FIG. 1. FIG. 6 illustrates an example of the display and inputs provided by the monitor 70 for each remotely-located player selecting the roulette game; and FIG. 7 illustrates an example of a dealer's keyboard which may be provided at the casino for each roulette table.

Thus, the monitor 70 (FIG. 6) at the remotely-located player station includes a section 71 displaying the actual roulette table at the casino, including all its numbers and colors and the wheel. Also reproduced on monitor 70 is a reproduction of the roulette table at 72 such as to enable the players to place a bet by moving a betting piece, schematically indicated at 73, to overlie a displayed number, or to straddle plurality of displayed numbers, according to the rules of the roulette game. It will be appreciated that the software provided the player reproduces the roulette table displays 71 and 72 on the player's monitor 70, and enables the player to move the betting piece 73 by the conventional input means provided on the player's computer, e.g., by using a mouse to move the cursor and clicking the mouse to effect the number selection, the amount selection being specified by the number of "clicks", according to the rules and rates provided initially to the player, as indicated above.

The player's monitor 70 further includes a section 74 for displaying the selected number of the bet, a section 75 for displaying the amount of the bet, and a section 76 for displaying the current credit status of the player's account.

Figure 7:
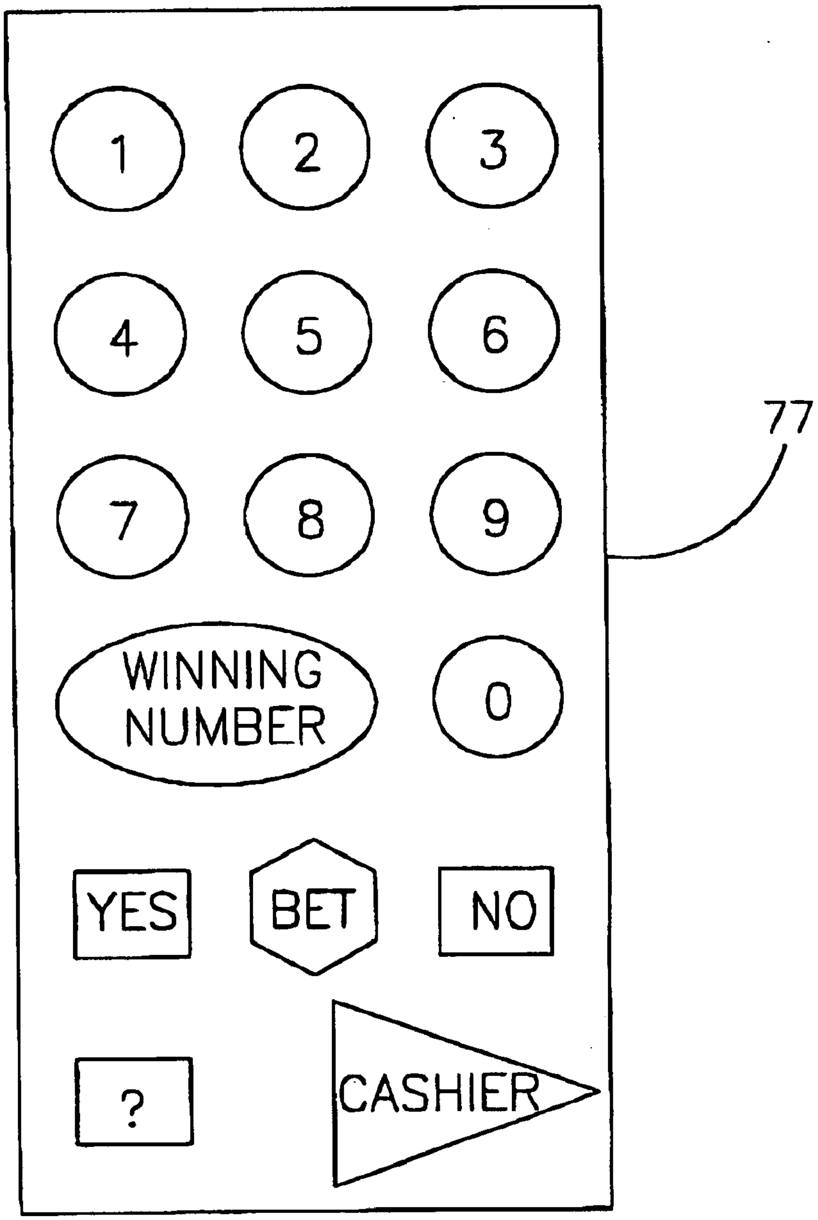
FIG. 7 illustrates a dealer's keyboard at a roulette table in the casino.

FIG. 7 illustrates an example of a dealer's keyboard 77 which may be provided at the casino for each roulette table, the selected depression of the keys by the dealer producing the following messages in section 78 of the monitors for all players playing at the respective table.

TABLE 2

| | | | | |
|---|---|---|---|---|
| BET | + | YES | → | PLACE YOUR BET |
| BET | + | NO | → | BETTING CLOSED |
| WINNING NUMBER | + | 22 | → | WINNING NUMBER IS 22 |
| BET | + | ? + 3 | → | PLAYER 3 - DO YOU BET? |
| ? | + | CASHIER | → | DO YOU WANT TO CHANGE MORE CREDIT? |
| CASHIER | | | → | THANK YOU FOR CHOOSING US AS YOUR CASINO |

The Slot Machine

Figure 8A:
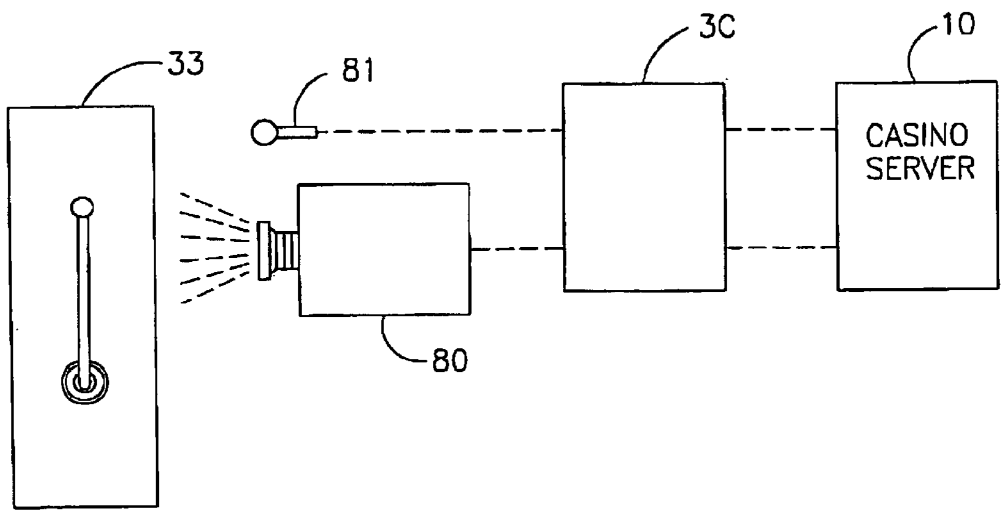
FIG. 8*a* illustrates a slot machine, camera, and data processor at the casino.
Figure 8B:
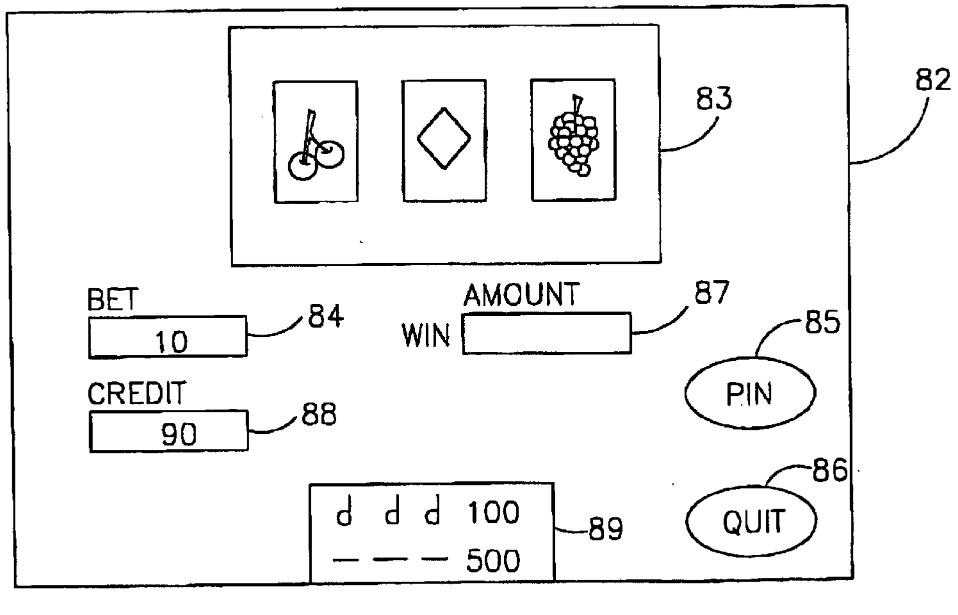
FIG. 8*b* pictorially illustrates a typical display and the inputs at the player's station for playing the slot machine of FIG. 8*a;*

FIG. 8 illustrates an example of a slot machine (such as slot machine 3, in FIG. 1), that may be provided in any desired number at the casino; and FIG. 8*b* illustrates an example of the monitor displays and inputs produced at the remotely-located player station.

Thus, as shown in FIG. 8*a*, the slot machine 3 is a the real slot machine at the casino, preferably of the type that is actuated by the depression of a button. Each slot machine 3 is provided with a camera 80 viewing the slot machine, particularly its rotary wheels, and a microphone 81 picking-up the sounds of the slot machine 3. The outputs of the camera 80 and microphone 81 are fed to the slot machine computer 3*c* which in turn is connected to the casino server 10, as briefly described above with respect to FIG. 1.

FIG. 8*b* illustrates the monitor 82 at the remotely-located player station when the player selects a slot machine for playing. This monitor includes a section 83 for displaying the rotary wheels of the slot machine 3 at the casino. It also includes a section 84 to input a "BET" command and to specify the amount of the BET; a section 85 to input a "SPIN" command to actuate the slot machine at the casino; and a section 86 to input a "QUIT" command, to indicate this player has decided to discontinue further playing the slot machine. In addition to these input devices, monitor 82 further includes a section 87 for displaying the "WINS" and "LOSSES"; and a section 88 for displaying the current credit status of the account. Preferably, monitor 82 also includes a section 89 for displaying the WIN possibilities of the slot machine.

The Dice Game

The dice game 6 illustrated in FIG. 1 may be played in a similar manner as the slot machine except that the player, instead of remotely actuating the slot machine, would remotely throw the dice. For example, the dice could be included in a cage as shown at 6 in FIG. 1; and the actuation of the dice could be effected by flipping over the cage. Alternatively, the dice could be ejected onto a table by the player from the remote location.

The dice game may also be played by the remote player in a passive manner, i.e., by merely placing bets with respect to dice thrown by another player, for example, a player at the actual casino or another remotely-located player.

Operation

Figure 9:
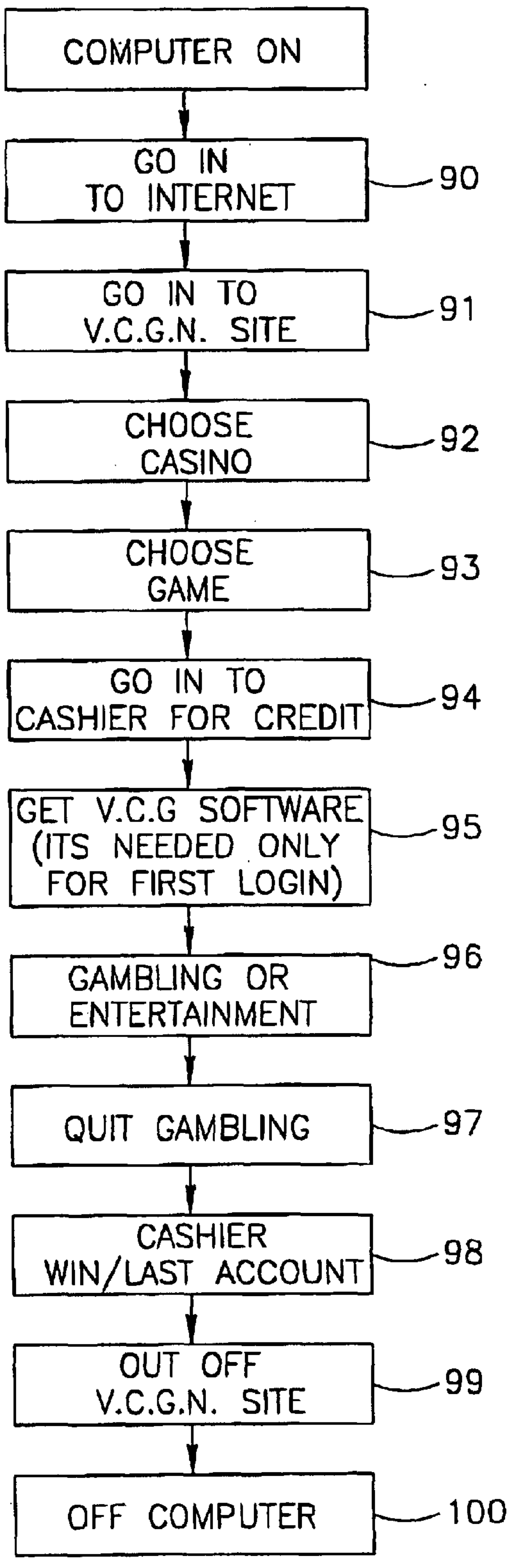
FIG. 9 is a flow chart illustrating the overall operation of the system.

FIG. 9 is a flow chart illustrating the main steps in the operation of the system by a remotely-located player having a computer. In this example, it will be assumed that the player uses the internet network for establishing communication with the system.

Figure 10:
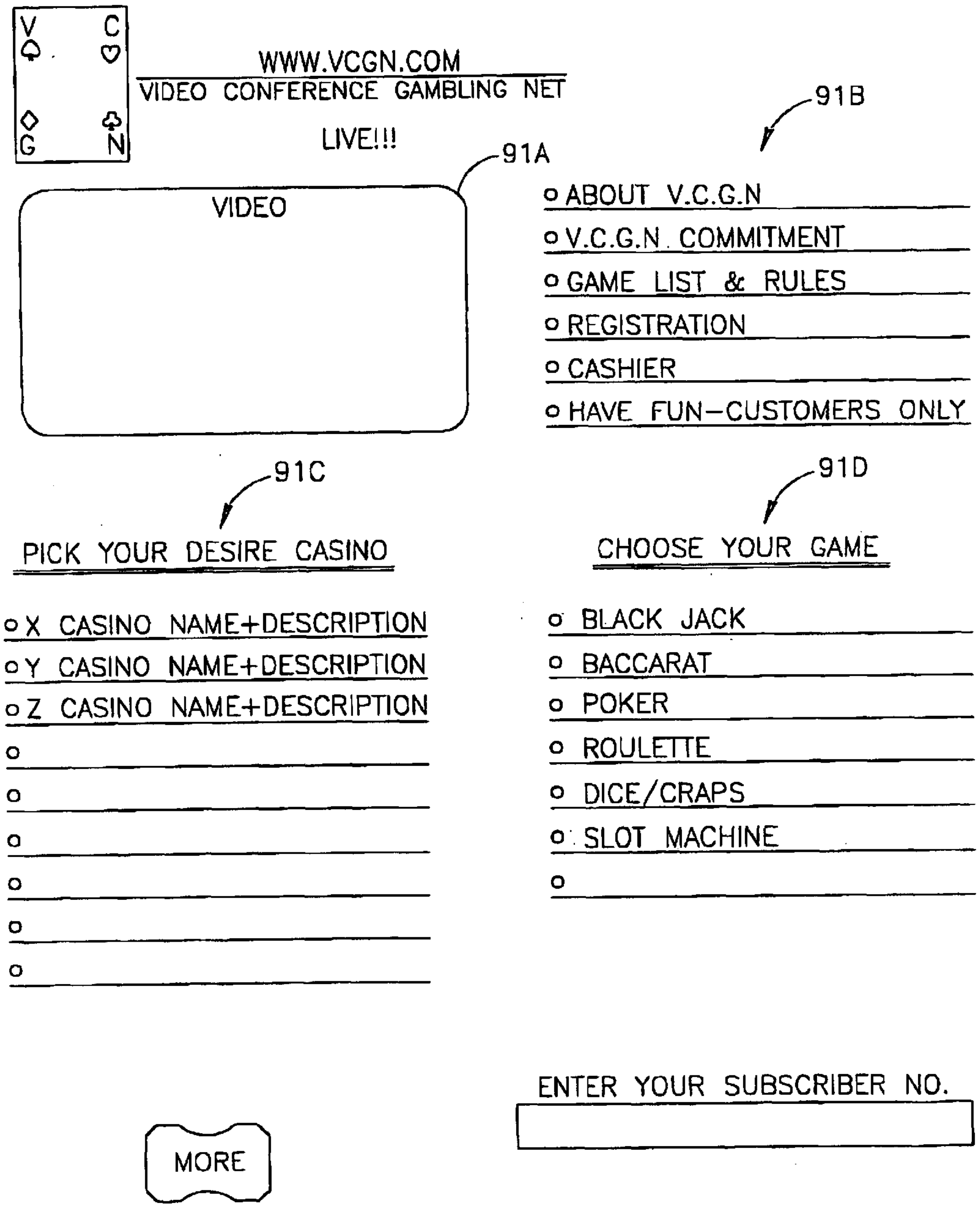
FIG. 10 illustrates a Home Page which is displayed to the player when initially establishing contact with the gambling game systems.

Thus, when the player enters the internet (block 90), the monitor at the player's computer displays a Home Page (block 91). An example of a Home Page display is shown in FIG. 10. It includes a section 91*a* for displaying an actual casino in real time; another section 91*b* for enabling the player to obtain further information, to register, to establish credit, etc.; another section 91*c* for enabling the player to select a desired casino; and a further section 91*d* for enabling the player to select the desired game. If the player has previously been registered as a subscriber, another section 91*e* of the Home Page display enables the player to enter the subscriber number.

As shown by blocks 92 and 93 in FIG. 9, the player may then choose a casino via section 91*c* of the Home Page display (FIG. 10), and a game via section 91*d* of the Home Page display.

Figure 11:
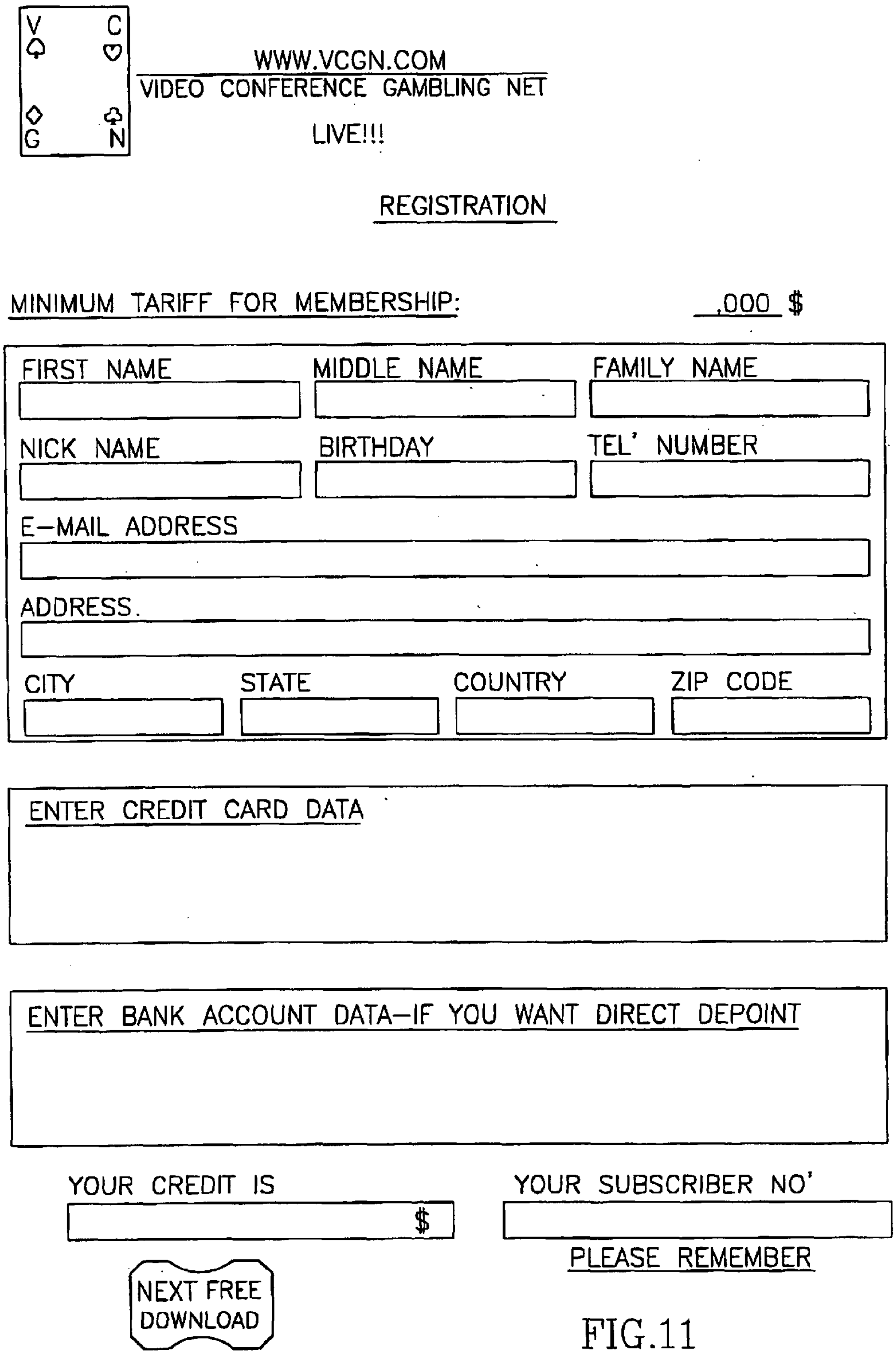
FIG. 11 illustrates a registration form to be displayed to the player, and to be completed by the player, as one means for establishing the necessary credit.
Figure 12:
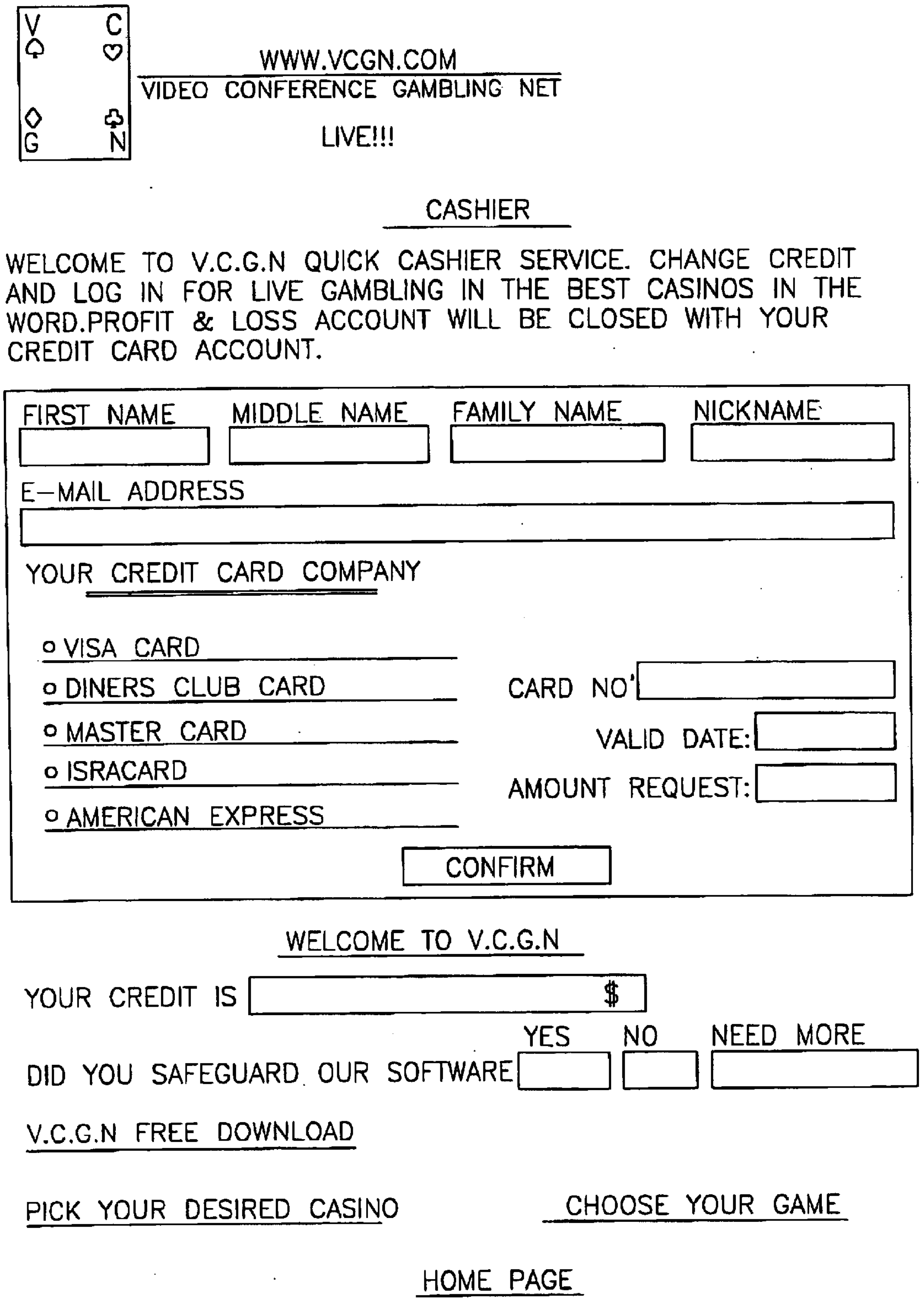
FIG. 12 illustrates a cashier form, to be displayed to the player and to be completed by the player, as another means for establishing credit.

The player must then establish credit (block 94). This may be done by registering as a subscriber for future participation as well, or by establishing credit with the cashier for only the one time participation. An example of a registration display for registering as a subscriber is illustrated in FIG. 11, and an example of a display for establishing one-time credit with the cashier is illustrated in FIG. 12.

Figure 13:
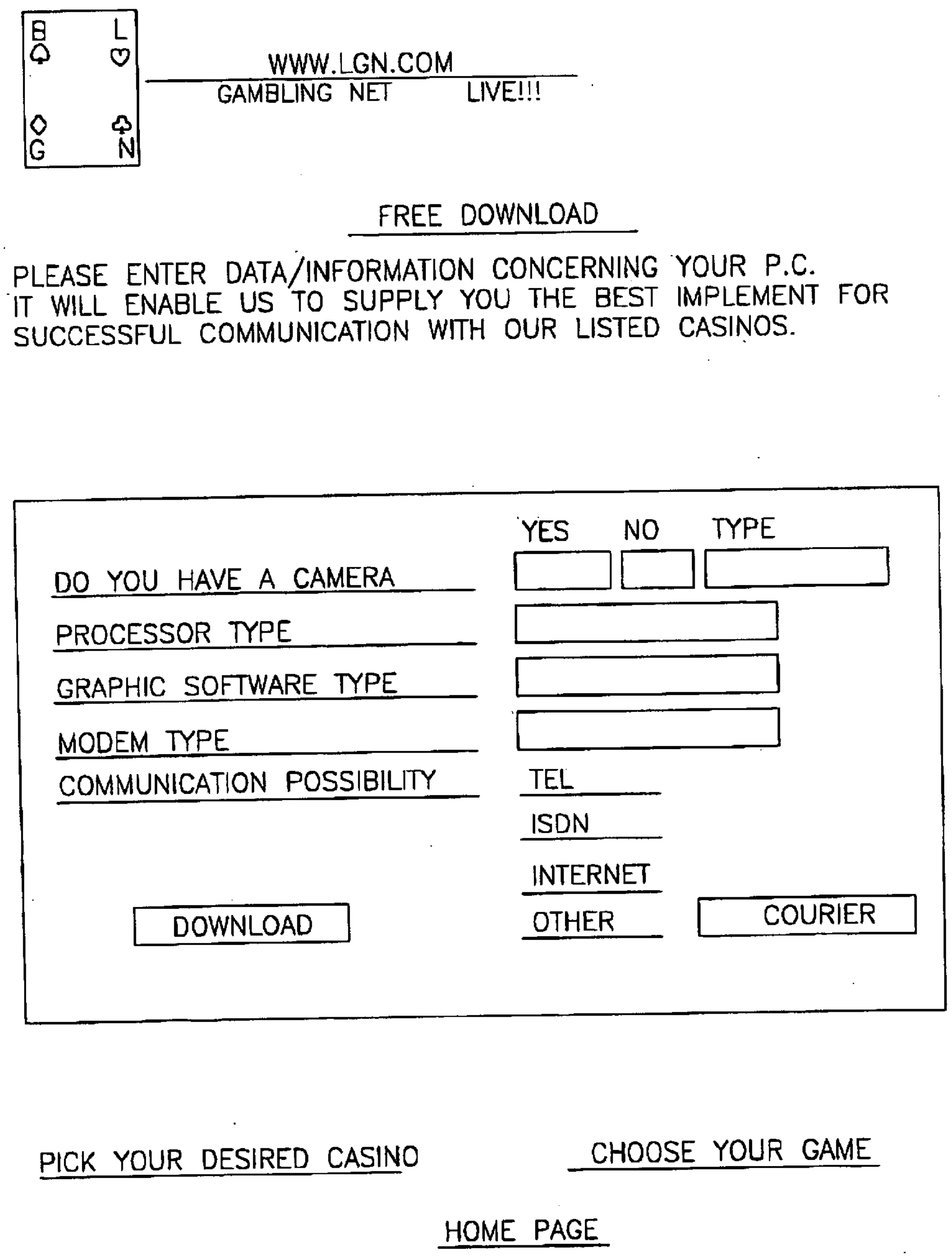
FIG. 13 illustrates an example of a display to the player to enable the player to select a casino and a game device.

Once the player's credit has been established, the player may then obtain the necessary software according to the game and casino selected (block 95). FIG. 13 illustrates a display that may then appear on the player's monitor for this purpose, enabling the player to inform the system of the particular computer equipment available to the player at the remote location. If the player has not yet selected a casino or game, the display in FIG. 13 would now require the player to specify this information before continuing.

Figure 14:
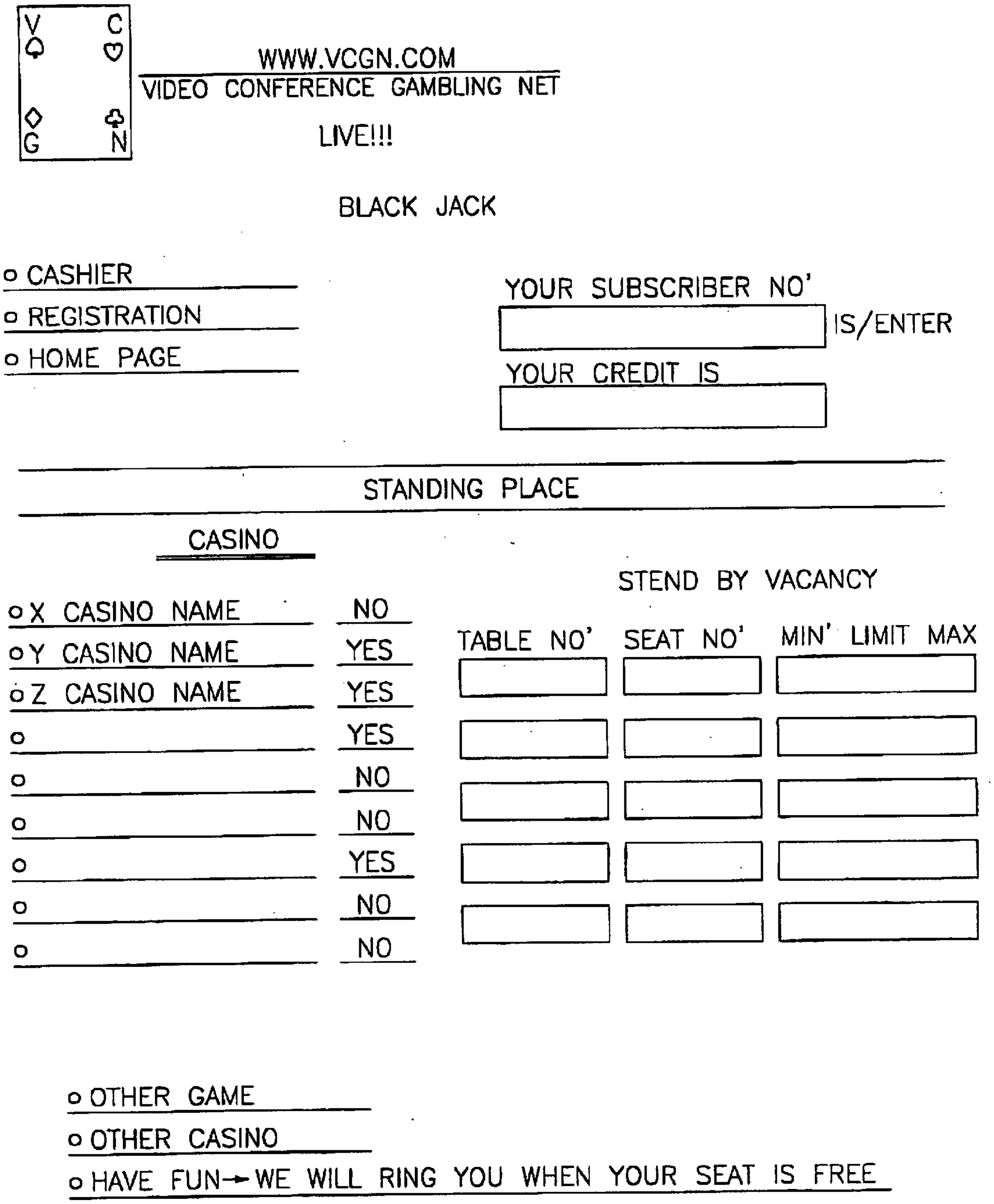
FIG. 14 illustrates a display to the player when the player selects the game black-jack.
Figure 15:
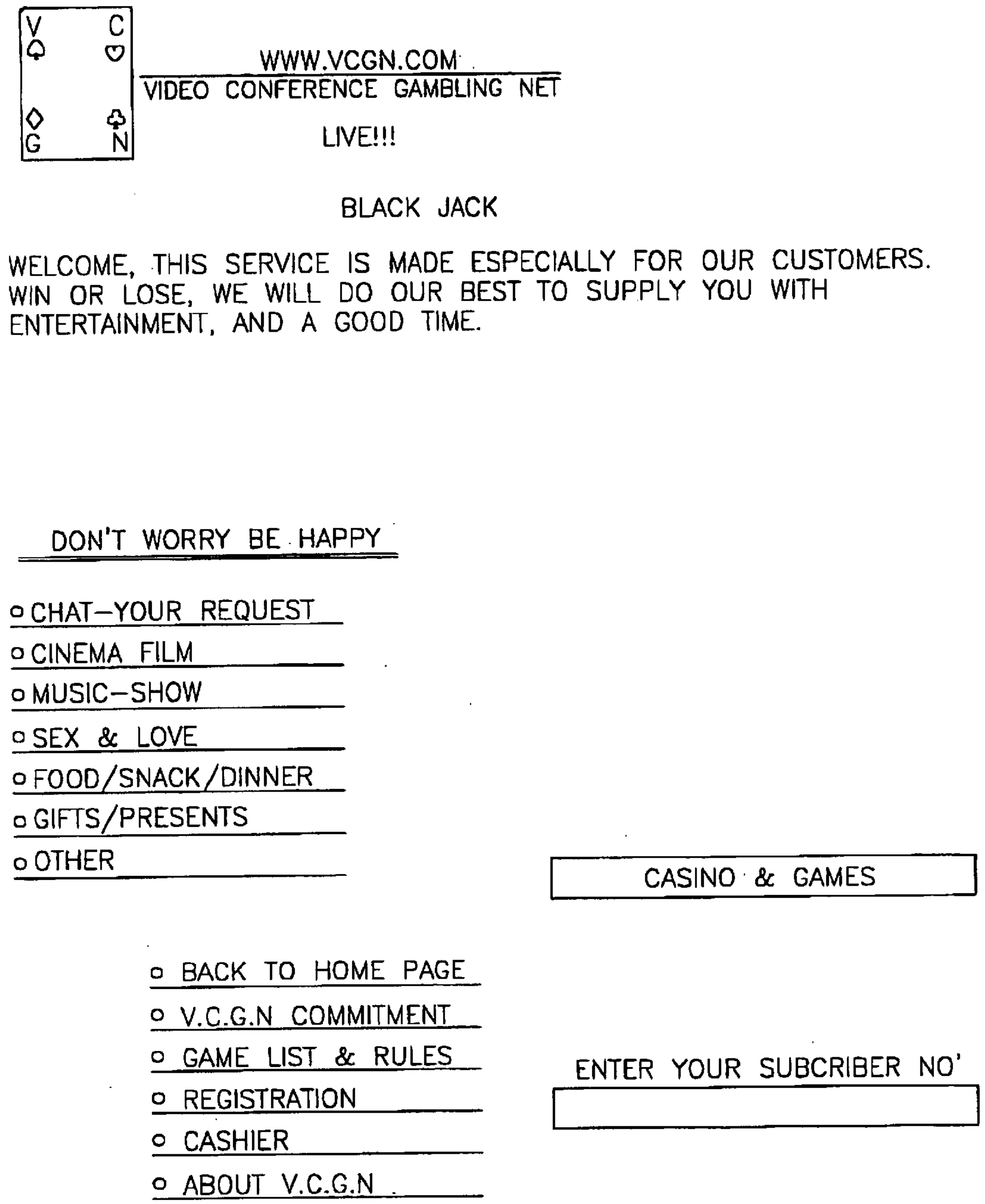
FIG. 15 illustrates a display to the player in order to enable the player to select another form of entertainment other than gambling, e.g., while waiting for an opening in a selected game device.

FIG. 14 illustrates an example of a display appearing on the player's monitor specifying the game black-jack. This display would identify to the player the name of the casino, the table number, seat number, the minimum and maximum limit of the respective table, etc. This display would also enable the player to select another game, or another casino, or not to gamble for the time being, e.g., while waiting for a vacant place at a desired table in a desired casino. FIG. 15 illustrates an example of a display that may appear on the players monitor when selecting entertainment, rather than gambling.

When the player selects gambling (block 96), the player's monitor displays the actual game device selected at the selected casino, and enables the player to actually participate in the game as if the player were present in the casino, in the manner described above. The remotely-located player thus actually sees the hears events occurring at the game table, and receives a running account of the WINS and LOSSES, and the current status of the player's credit account. If the player's account is not sufficient to cover a BET, the dealer can inform the player of this and can provide other messages or instructions by the use of the dealer's keyboard, e.g., 58 in FIG. 3, 69 in FIG. 5, or 76 in FIG. 7. As also described above, the various displays on the player's monitor enable the player to specify the desired BET, and also to provide whatever other information is needed for playing the game. For example, in playing black-jack, the player 10 informs the remotely-located dealer whether another card is desired, etc., (FIG. 4) by inputting the appropriate command in section 64 of the players monitor, by speaking the appropriate command via the telephone microphone, or by making the appropriate hand signal to the dealer if the player's location is equipped with a camera.

If the player prefers to wait for an opening in a desired game device in a desired casino, the player may select "entertainment" (block 96), rather than "gambling" whereupon a non-gambling menu will be displayed, such as shown in FIG. 15, for selection by the player.

When the player decides to quit the gambling session (block 97), this is also communicated to the system in one of the above-described manners, whereupon the system makes an accounting of the results of that particular gambling session (block 98). The player may then disconnect the communication with the casino site (block 99), and turn off the computer (block 100).

It is a feature of the gambling game system of the invention that the real casino atmosphere is especially applicable to card games in which one or more cards or hidden and where cards are dealt by the player, such as traditional poker and baccarat, which will be described in further detail below. The physical involvement of the players is an integral part of these games and it is a further feature of the present invention that the remote player can view the player's physical reactions as if he was sitting at the same table, as described below.

Caribbean Stud Poker Table

Figure 16:
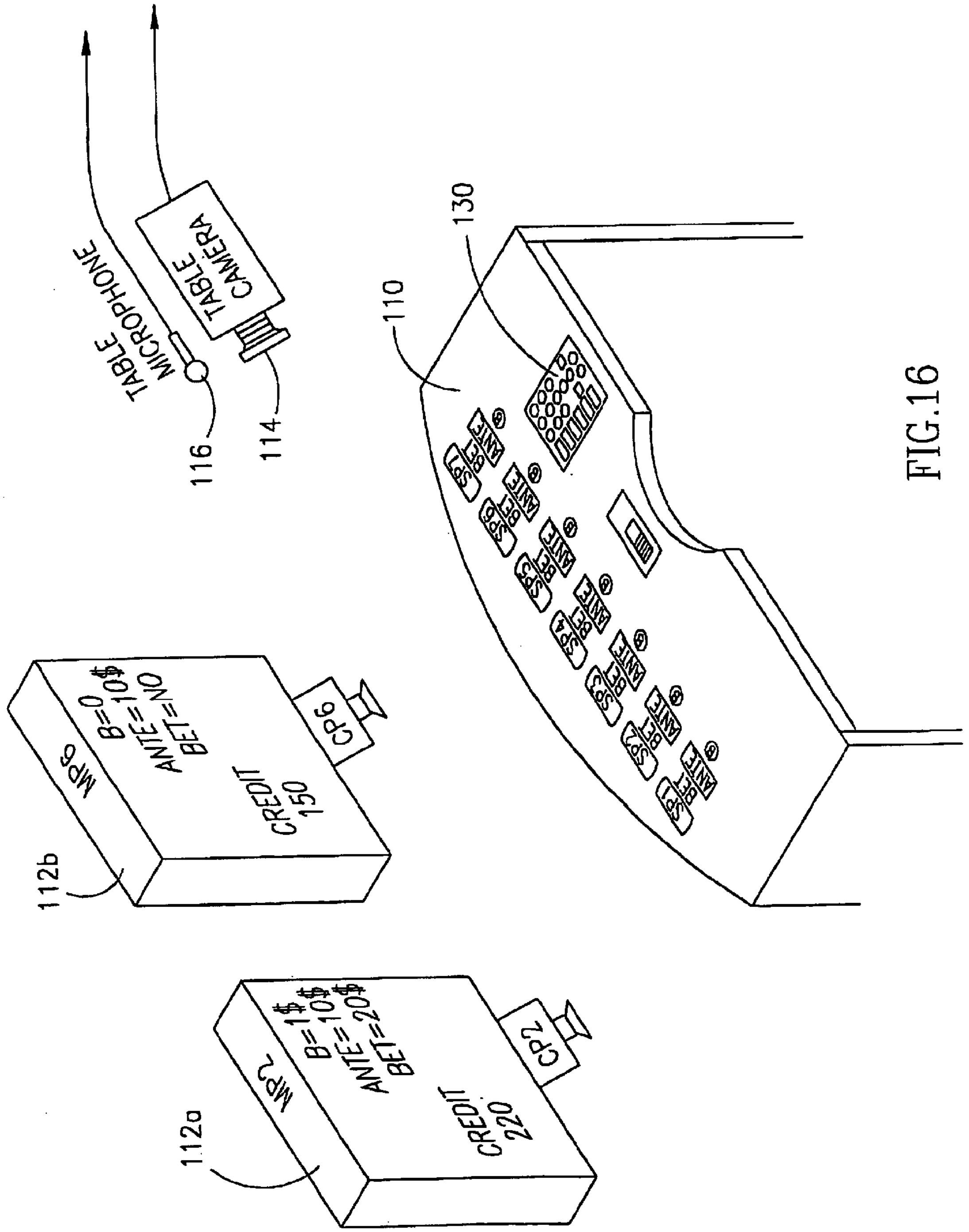
FIG. 16 is a pictorial illustration of a Caribbean stud poker table at the casino of FIGS. 1 and 2.

FIG. 16 pictorially illustrates a Caribbean stud poker table 110 at the casino, including its displays and cameras; FIG.

Figure 18:
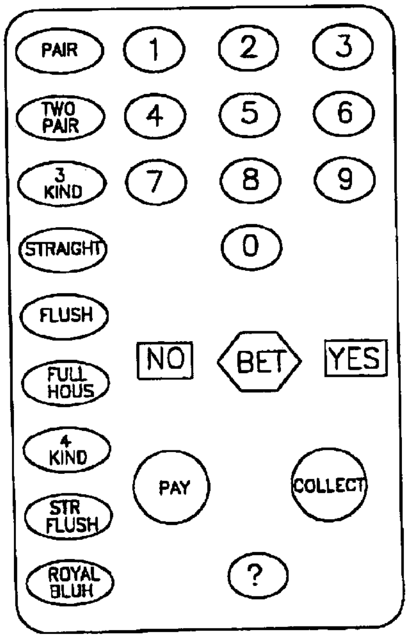
FIG. 18 illustrates the dealer's keyboard for use at the Caribbean stud poker table of FIG. 18.

17 pictorially illustrates the displays and inputs at each of the player stations; and FIG. 18 pictorially illustrates the dealer's keyboard 130 that may be used at the Caribbean stud poker table 110 in the casino. The Caribbean stud poker table 110 also shows the positions for each of seven players, referenced SP1 to SP7. However, for purposes of clarity, only two of the monitors 112*a*, 112*b*, one for each of the two player positions (numbers 2 and 6). Monitors 112*a*, 112*b*, display information, similar to that described hereinabove with respect to the blackjack table of FIGS. 3–5. Each player position includes an electronic camera CP2, CP6, which is focussed on the portion of the Caribbean stud poker table 110 allocated to the respective player position. Only the specific player can see his own hidden cards.

A table camera 114 is focussed to view the complete Caribbean stud poker table 110 and the dealer to view both the dealer and the dealer's cards as played by the dealer. The Caribbean stud poker table 110 is further equipped with a table microphone 116 to pick-up the sounds at the table, in general, and the instructions and messages made by the dealer.

Each Caribbean stud poker table 110 further includes a keyboard 130 which may be used by the dealer for inputting certain information, and/or for communicating various messages to the players, similar to that described above with respect to FIG. 5.

In the game of Caribbean stud poker, each player wishing to take part places his bet (known as ante) and is dealt a five-card hand, The dealer also receives five cards but only one of which is exposed. The player now either folds, losing his ante or bets an additional amount equal to twice the ante. The dealer then reveals the four remaining cards of his hand. If the dealer's hand is not Ace-King or better, the player is paid even money on the ante and nothing on the bet. If the dealer's hand is better then Ace-King, it qualifies for play against the player. Should the dealer have a better hand than the player, the player loses both his ante and the bet. If the player has a better hand, he receives a payout depending on the player's hand. There is also an optical independent side bet of $1.00 is available for which the player is paid for being dealt premium hands (flush or better). The payoff is usually progressive depending on the hand.

Figure 17:
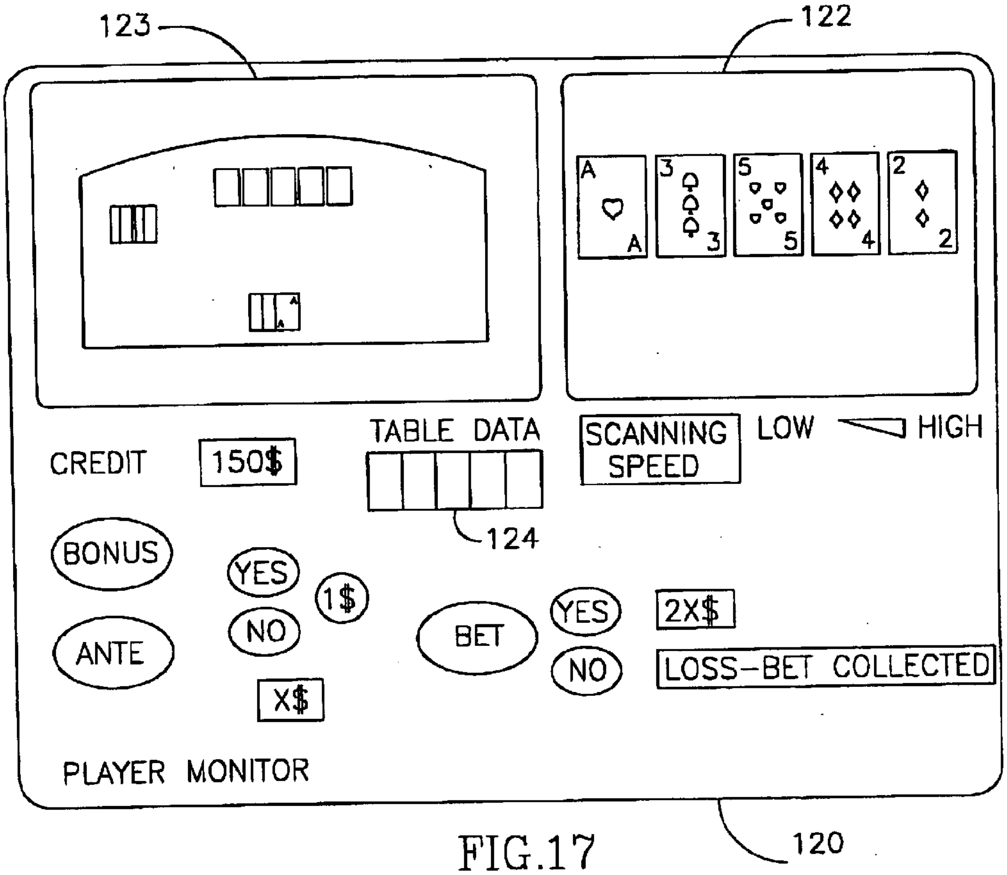
FIG. 17 is a pictorial illustration of the displays and inputs at a player station for remotely playing the game of Caribbean stud poker at the card table of FIG. 16.

FIG. 17 illustrates the monitor generally designated 120, at one of the player stations at a remote location with respect to the casino. In the game of Caribbean stud poker, the monitor 120 displays the following: display frame 122, showing the player's card as viewed by the player's camera 112*a*, 112*b* at the respective player position of the table; and display 123, for displaying all the cards on the table as viewed by the table camera 114 including the dealer's cards. The face up cards are displayed in display frame 123 as viewed by the table camera 114 and the covered (or hidden) cards are displayed via the scanner 66 (FIG. 2) located below the table 110 in frame 122.

Monitor 120 further displays a plurality of messages relating to various types of information which can be selected by the player in the course of playing the game, including the table data 124 for each of the players (SP1–SP7). The selection of a message can be effected in any one of the known manners as described hereinabove.

For example purposes only, the messages illustrated in FIG. 17 which may be selected by the player include: "ante" 126 for his initial entry into the game; "bet" 127 to add twice the ante after seeing his hand; and "bonus" 127 for the side bet.

Monitor 120 also includes a credit display 128 established by the player beforehand as described above, and displays showing the ante, bet and bonus (if applicable) made by the player for the respective game. Each "win" in registered as a credit, and each "non-win" is registered as a debit, according to the rates and rules of the game.

The table computer for the card table 110 includes the appropriate video/audio circuitry connected to the various cameras and microphones for the respective player, and also the appropriate modem according to the specific communication medium used between the remotely-located player and the selected game device at the casino, similar to that shown in FIG. 2.

FIG. 18 illustrates the dealer's keyboard, generally designed 130. Keyboard 130 is similar to keyboard 70 illustrated in FIG. 5 except that different keys are shown, each key or combination of keys performing different functions, examples of which are shown in Table 3. Several functions are similar to that described in Table 1.

TABLE 3

| | | | | | | |
|---|---|---|---|---|---|---|
| BET | | | | | | PLACE YOUR BET |
| BET | + | NO | | | → | NO BET |
| ? | + | BET | + | PLAYER # (1, 2 ETC) | → | DO YOU BET? |
| YES | + | BET | + | PLAYER # (1, 2 ETC) | → | BET ACCEPTED |
| COLLECT | + | PLAYER #(1, 2 ETC) | | | → | INFORM ABOUT LOSS |
| PAY | + | PLAYER # | + | PAIR | → | PLAYER # CREDITED WIN (1:1) + BONUS IF APPLICABLE |
| PAY | + | PLAYER # | + | TWO PAIR | → | PLAYER # CREDITED WIN (2:1) + BONUS IF APPLICABLE |
| PAY | + | PLAYER # | + | 3 OF KIND | → | PLAYER # CREDITED WIN (3:1) + BONUS IF APPLICABLE |
| CASHIER | | | | | | THANKS FOR CHOOSING US AS YOUR CASINO |

Traditional Poker Table

Figure 19:
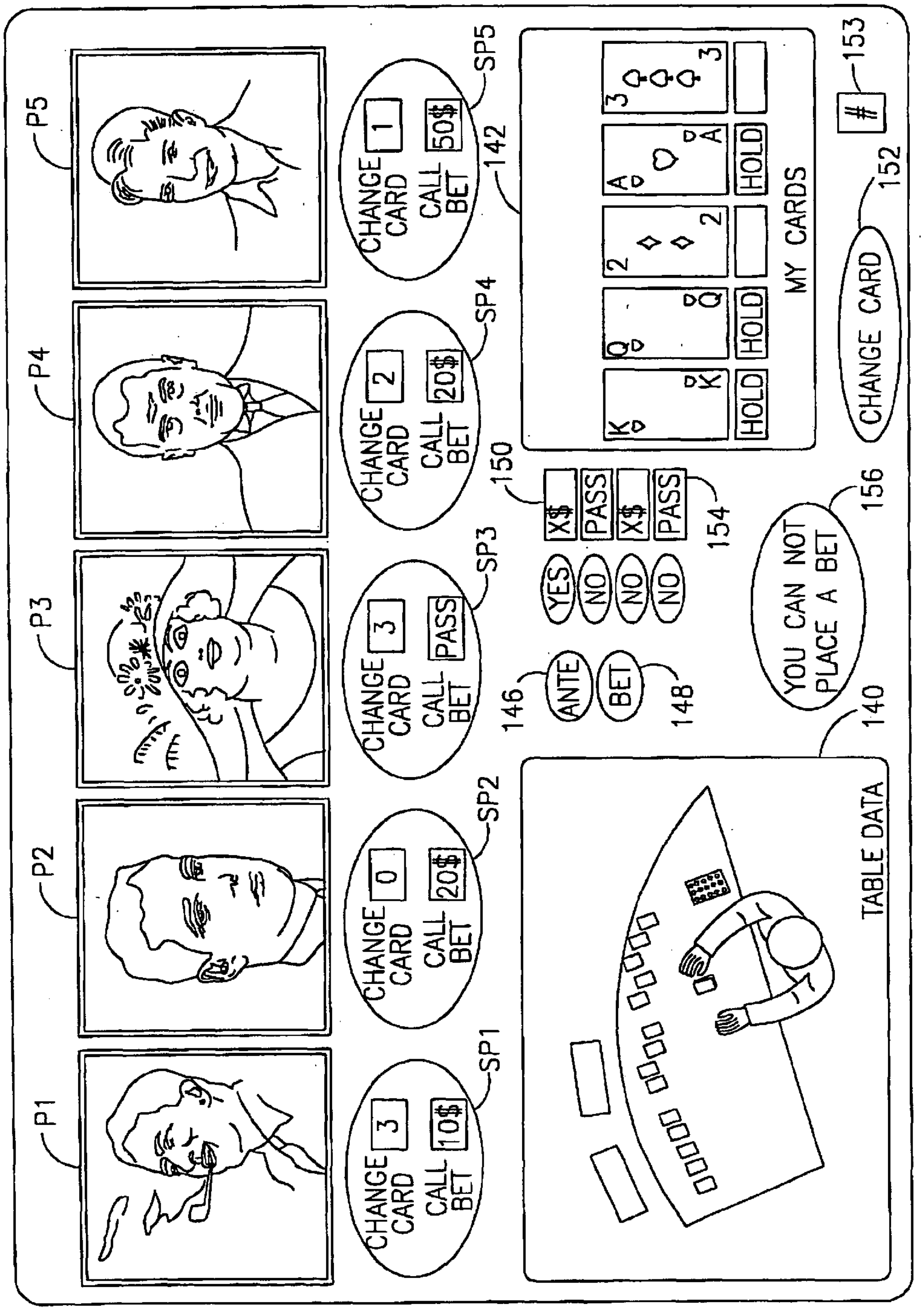
FIG. 19 is a pictorial illustration of the monitor of the player/ customer for the game of stud poker.

FIG. 19 pictorially illustrates the displays and inputs at each of the player stations for a game at a traditional poker table 140 at the casino. The poker table 140 is similar to the Caribbean stud poker table 110 illustrated in FIG. 16. The dealer's keyboard for traditional poker is also similar to the dealer's keyboard 130 shown in FIG. 18. Elements, such as the poker table and keyboard, having similar functions are similarly designated and will not be further described.

In contrast to Caribbean stud poker, players of traditional poker have the option of replacing one or more of the five cards there are dealt. Also, betting between the players can continue for several rounds until either a player 'folds' his cards or 'passes' (that is, exits from the game and loses his bets) and only one player remains as the winner of the 'pot'.

FIG.19 illustrates the monitor generally designated 140, of the player/customer at a remote location with respect to the casino. The monitor 140 displays the following: display frame 142, showing the player's card as viewed by the player's scanner camera 66 (FIG. 2) located below the table 110. At the end of each round, the cards are turned over and displayed, as previously described, are viewed by the table camera 114.

Since bluffing is an integral element in the game of poker, it is vital that the remote players see the expressions on the faces of the other players. The faces of the other players (referenced P1 . . . P5) are thus displayed on the monitor 140. In addition their betting status (referenced SP1 . . . SP5) is also displayed below the picture of the corresponding player. For example, the status SP1 of player P1 indicates that he has changed one card and that his last bet was $10. The status SP3 of player P3 indicates that three cards were changed and that the player passed and did not bet. The other players (SP2, SP4 and SP5) are still in the game, player P5 having changed one card and raised the bidding to $50. The display of the status messages can be effected in any one of the known manners as described hereinabove.

In addition, the player's betting data is also displayed. For example the data displayed includes information regarding the "ante" 146 position for his initial entry into the game and his "bet" position 148 during the game. In both cases, the player can indicate his actions. Thus if he wishes to play he selects ante (yes/no) and enters the amount (150) of the ante. He can change cards by selecting "change" 152 and entering the number (#) 153. If he continues playing, he can bet (148) by selecting 'yes' and entering the amount (154) of the bet.

The monitor 140 also includes a credit display (not shown for clarity) established by the player beforehand, as described above.

Finally, monitor 140 displays messages 156 (such as "you can place a bet" sent by the dealer.

Baccarat Table

Figure 20:
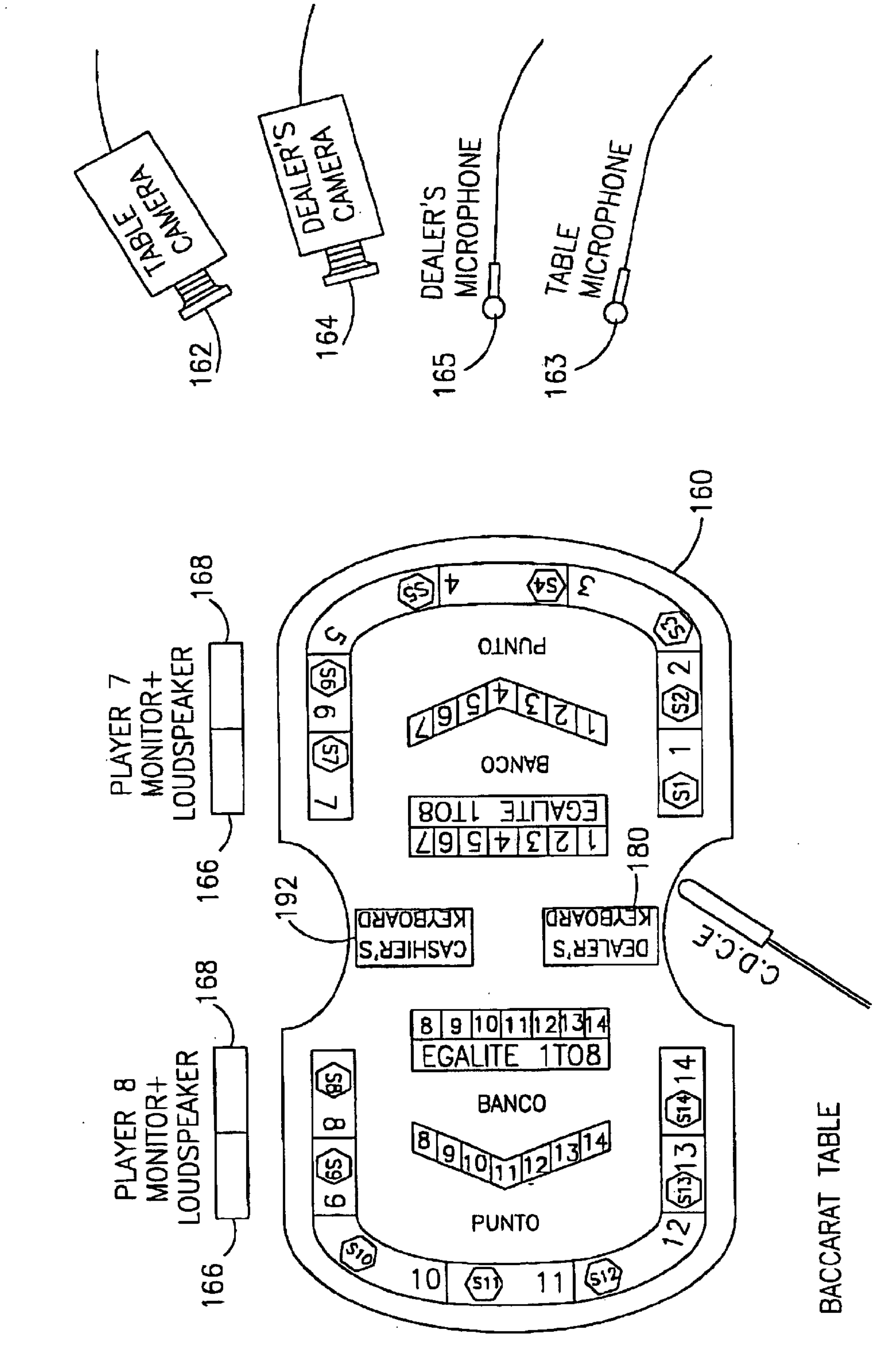
FIG. 20 is a pictorial illustration of a Baccarat table at the casino of FIGS. 1 and 2.
Figure 21:
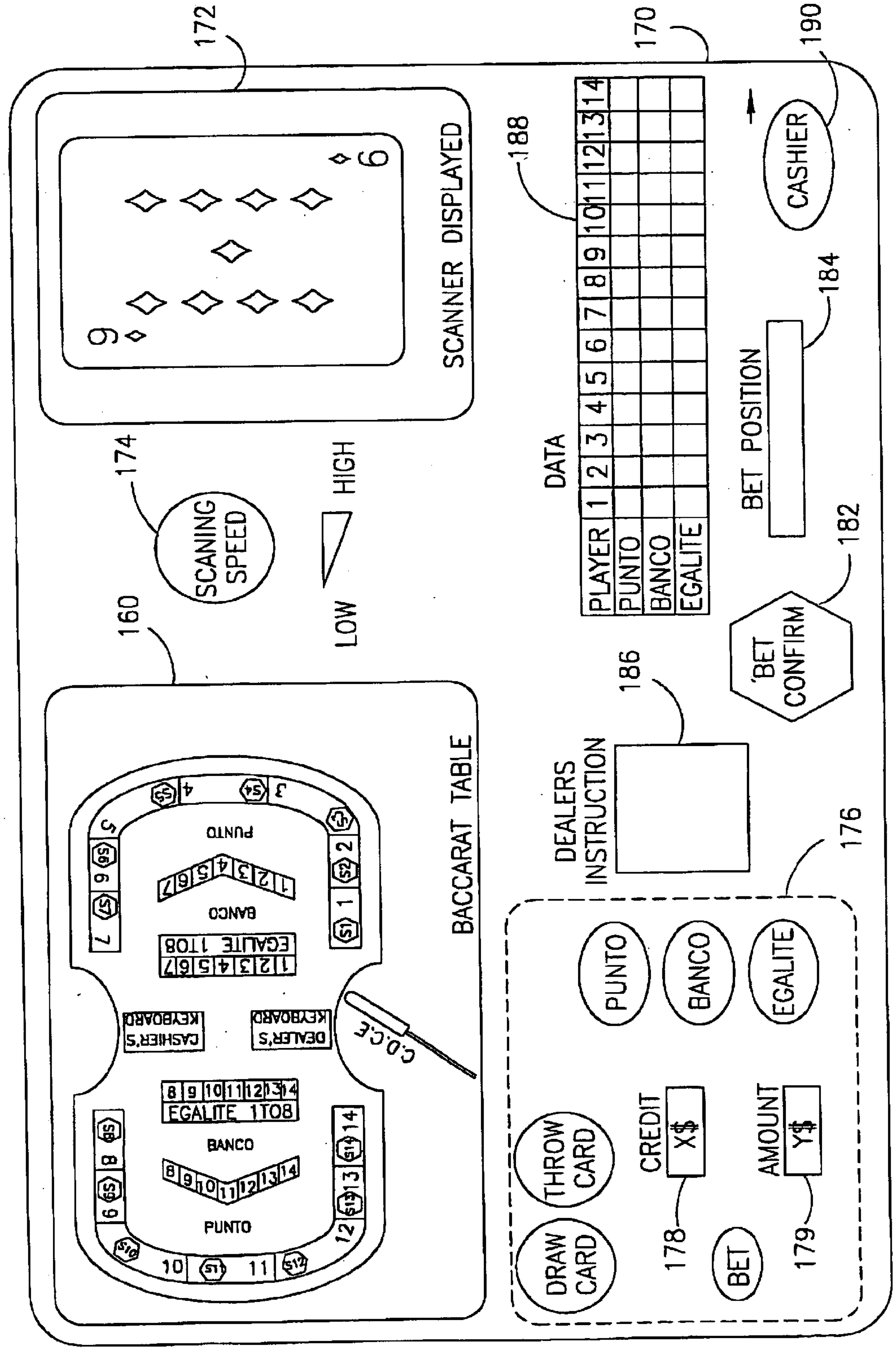
FIG. 21 is a pictorial illustration of the displays and inputs at a player station for remotely playing the game of Baccarat at the card table of FIG. 20.
Figure 22:
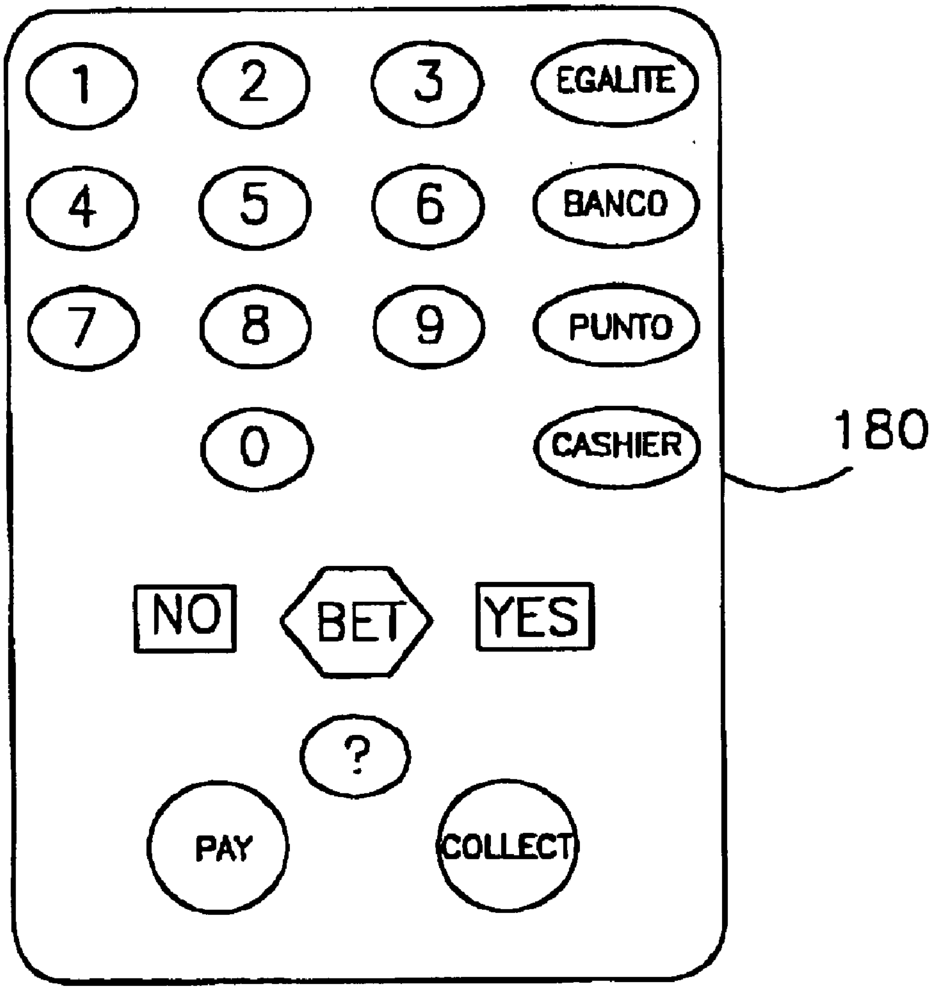
FIG. 22 pictorially illustrates the dealer's keyboard for the game of Baccarat.

Reference is now made to FIGS. 20–22, which schematically illustrate the game of Baccarat at the Baccarat table 160 at the casino. FIG. 20 illustrates the Baccarat table 160 together with the table's camera 162 and microphone 163 and the dealer's camera 164 and microphone 165. For each of the players, there is a monitor 166 and microphone 168. FIG. 21 pictorially illustrates the displays and inputs at the monitor 170 of remote player stations and FIG. 22 pictorially illustrates the dealer's keyboard 180 for the game. The Baccarat table 160 allows for 14 participants (S1 . . . S14) seated around the table. There is a scanner located below the table for each player to show him his hidden cards.

The cameras, microphones and player monitors are similar to the devices described hereinabove and will not be further described.

Briefly, Baccarat is a card game that is dealt each time by one of the players (Banco) from a shoe 169 that holds 6 or 8 decks of cards. The dealer acts a supervisor not taking part in the game itself, but making declarations, ensuring that the game is played according to the rule, moving the shoe to the player who is dealing (Banco) and organizing the cards that are dealt.

Two hands ("banker" and "player") are dealt by the house dealer. Before the hands are dealt, bets may be placed on the banker hand (Banco), the player hand (Punto) or on a tie (Egalite). Once a bet had been placed, there are no opportunities for further decisions and hands are dealt according to fixed rules. The value of the hand equals the value of the cards, with 10 and picture cards having a value of 0. Only the last digit is counted and the hand with the highest value wins. Any player including the remote player may act as banker.

FIG. 21 pictorially illustrates the player/customer monitor 170 displays and inputs at the remote player stations. The monitor 170 displays the table 160 with the dealt cards on the table as viewed by the table camera 162. As previously described, the face up cards are viewed by the table camera 162 and the covered cards are displayed via the scanner 66 (FIG. 2) located below the table 160. The scanned card is seen in frame 172. A control 174 allows for the scanning speed to be adjusted so as to simulate the speed of turning over of the face-down card. The dealing player's scanned card is only seen by his scanner. The card is seen by the table only after the card is turned over by the dealer as viewed by camera 162.

Also reproduced on monitor 170 is a reproduction of the Baccarat table 160, specific keys, generally designated 176, for the player to enter his instructions, a credit display 178 (established by the player beforehand) and the amount of the bet 179, as well as a "bet confirm key 182" and the betting position 184. The monitor 170 also displays the dealer's instructions and messages 186.

Optionally, in addition, the player can enter data 188 related to each of the 14 player positions around the table to keep a record of the type of bets each player makes. The monitor 170 also has a key 190 for contacting the cashier who sits opposite the dealer. The cashier's instructions using his own keyboard 192 (FIG. 20) which may be relayed to the player in a similar manner to that of the dealer.

FIG. 21 illustrates the Baccarat dealer's keyboard 180. Keyboard 180 is similar to keyboard 70 and 130 illustrated in FIGS. 5 and 18, respectively, except that the keys are specifically coded for the game, each key or combination of keys performing different functions, examples of which are shown in Table 4. Several functions are similar to that described in Tables 1, and 3.

TABLE 4

| | | | | | | |
|---|---|---|---|---|---|---|
| Bet | | | | | | PLACE YOUR BET |
| BET | + | NO | | | → | NO BET |
| ? | + | BET | + | PLAYER # (1, 2 ETC) | → | DO YOU BET? |
| BET | + | NO | + | PLAYER # (1, 2 ETC) | → | PLAYER # BET NOT ACCEPTED |
| YES | + | BET | + | PLAYER # (1, 2 ETC) | → | BET ACCEPTED |
| BANKO | | | | | | BANKO WINS |
| BANKO | + | CASHIER | | | | INSTRUCTION TO CASHIER TO PAY BANKO WINNERS |
| EGALITE | | | | | | EGALITE WINS |
| EGALITE | + | CASHIER | | | | INSTRUCTION TO CASHIER TO |

TABLE 4-continued

| | | | | | |
|---|---|---|---|---|---|
| | | | | | PAY EGALITE WINNERS |
| PLAYER | + | CARD | + | PLAYER # (1, 2 ETC) | PLAYER # DEALS CARD |
| CARD | + | YES | | | PULL A CARD PLEASE |
| CARD | + | NO | | | NO MORE CARDS |
| CASHIER | | | | | THANKS FOR CHOOSING US AS YOUR CASINO |

While the invention has been described with respect to one preferred embodiment, it will be appreciated that this is set forth merely for purposes of example, and that many other variations, modifications, and applications of the invention may be made. For example, commands by the players can be by voice and converted by voice recognition techniques. Also, each table can be used at the same time by both remote players and regular players physically on the premises.

It will be further appreciated that the various casino games which have been described are only illustrative of the system and that the system is not restricted to any particular game, but may be adapted to suit the applicable rules and regulations. The operation of the system, as described hereinabove, is applicable to all games of chance such as card games including card games which have 'hidden' cards and games such as roulette. The system enables the remote player to effectively participate in the games as if he is present in the casino, remotely receiving the feel and atmosphere of the casino.

What is claimed is:

1. A gambling game system, comprising:

a central station including a plurality of betting-type game devices each involving an element of chance, and an electronic camera for each game device;

a plurality of player stations remotely located with respect to said central station, each of said player stations including a monitor for displaying a selected game device at the central station, and input means for selecting a game device, placing a bet by a player at the player's station relating to an action involving an element of chance to occur at the selected game device and effectuating said action; and data processing means for:

(a) establishing communication between said central station and each of said player stations;

(b) enabling a player at each player station via the input means at the player station to select a game device at the central station, to see via the monitor at the player station what occurs at the selected game device, and to place a bet via the input means at the player station relating to the action involving an element of chance to occur at the selected game device;

(c) displaying in the monitor at the player's station the action involving an element of chance as the action occurs at the selected game device, taken by said electronic camera;

(d) determining whether the action, after it occurs, resulted in a "win" or "loss" of the placed bet; and (e) maintaining a current account for the player in which each win is registered as a credit, and each loss is registered ass a debit, according to the rules and rates of the selected game device;

wherein said monitor is adapted to display a movie picture taken from said electronic camera.

2. The system according to claim 1, wherein: said central station also includes a microphone at each game device; each of said player stations also including a speaker enabling a player at each player station to hear, as well as to see, what occurs at the selected game device as it occurs at the central casino.

3. The system according to claim 1, wherein said current account for the player is continuously displayed and updated at the respective player station.

4. The system according to claim 1, wherein said plurality of betting-type game devices at the central casino include at least one in which the action involving an element of chance to occur at the game device is an action effected by a house person at the central station.

5. The system according to claim 4, wherein said central station includes a display for each game device; and said data processor means displays at the central station the bet placed by each player with request to each game device, and the current account for each player.

6. The system according to claim 5, wherein said at least one game device at the central station includes a table on which the action involving an element of chance is to be effected by the house person at the central station.

7. The system according to claim 6, wherein said table is a card table for playing a card game and has a player position for each of the players to play a card game at the table; said central station including a camera for each player position of said card table, and a display for displaying the bet and current account of the player at each player position of said card table; said input means at each player station including means enabling the player thereat to input commands to the house person at the central station relating to choices made by the player in playing the card game.

8. The system according to claim 7, wherein said central station further includes an input device, operated by the house person for the respective game device at the central station, for inputting information relating to each player position of said card table.

9. The system according to claim 8, wherein said input device operated by the house person is a keyboard including a plurality of keys selectively depressible by the house person to transmit to the monitor of a selected player information relating to the respective player.

10. The system according to claim 7, wherein at least some of said player stations include a camera selectively energizable by the player thereat for transmitting the player's image to the display of the respective player position at the card table.

11. The system according to claim 7, wherein there is a separate display at the central station for each player position at each card table at the central station.

12. The system according to claim 7, wherein said command input means includes a manual device for manually inputting said commands.

13. The system according to claim 7, wherein said command input means includes a microphone for voice inputting said commands.

14. The system according to claim 7, wherein said command input means includes a camera for visually inputting said commands.

15. The system according to claim 6, wherein said table is a roulette table including a roulette wheel, said roulette table being displayed in the monitor at the respective player station such that the player may place a bet thereon by the inupt means at the player station.

16. The system according to claim 1, wherein said plurality of betting-type game devices at the central station includes at least one in which the action involving an element of chance to occur at the selected game device in an action effected by the player at the player station.

17. The system according to claim 16, wherein said at least one game device is a slot machine to be activated remotely by the player at the player station.

18. The system according to claim 16, wherein said at least one game device is a dice game for dice to be thrown remotely by the player at the player station.

19. The system according to claim 1, wherein said central station is an actual casino which includes a plurality of different-type game devices selectable by a player at a player station, including a first group of game devices in which the action involving an element of chance is one effected by the player at the player station, and a second group of game devices in which the action involving an element of chance is one effected by a house person at the casino; each game device further including a microphone, and each player station including a speaker enabling a player at the respective player station to hear, as well as to see, what occurs at the selected game device as it occurs at the casino.

20. The system according to claim 19, wherein said first group of game devices include slot machines, and said second group of game devices include tables each having a plurality of player positions.

21. The system according to claim 1, wherein said data processor means includes: a data processor at each player station, a data processor at the central station for each game device thereat, a central data processor for all the game devices at the central station, and a communication system establishing communication between all said data processor.

22. The system according to claim 21, wherein there are a plurality of said central stations connected together in a network; said data-processor means enabling the player at said player station to select both a central station, and a game device thereat, for placing a bet.

23. The system according to claim 21, wherein said communication system includes the internet communication network.

24. The system according to claim 21, wherein said communication system is a dedicated communication network using public telephone lines for communication between the central station and the player stations.

25. The system according to claim 1, wherein said plurality of player stations are at different locations.

26. The system according to claim 1, wherein said plurality of player stations are at a common location.

27. A method of providing gambling services, comprising:

providing a central station with a plurality of betting type game devices each involving an element of chance, and an electronic camera for each game device;

providing each of a plurality of player stations, remotely located with respect to said central station, with a monitor for displaying a selected game device at the central station, and input means for selecting a game device, placing a bet by a player at the player's station relating to an action involving an element of chance to occur at the selected game device and effectuating said action; and providing data processing means at said central station and said player stations for:

(a) establishing communication between said central station and each of said player stations;

(b) enabling a player at each player station via the input means at the player station to select a game device at the central station, to see via the monitor at the player station what occurs at the selected game device, and to place a bet via the input means at the player station relating to the action involving an element of chance to occur at the selected game device;

(c) displaying in the monitor at the player's station the action involving an element of chance as the action occurs at the selected game device, taken by said electronic camera;

(d) determining whether the action, after it occurs, resulted in a "win" or "loss" of the placed bet; and (e) maintaining a current account for the player in which each win is registered as a credit, and each non-win is registered as a debit, according to the rules and rates of the selected game device;

wherein said monitor is adapted to display a movie picture taken from said electronic camera.

28. The method according to claim 27, wherein said central station is also provided with a microphone at each game device and each of said player stations is also provided with a speaker enabling a player at each player station to hear, as well as to see, what occurs at the selected game device as it occurs at the central station.

29. The method according to claim 27, wherein each player station also continuously displays and updates the current account of the respective player.

30. The method according to claim 27, wherein said plurality of betting-type game devices at the central station includes at least one in which the action involving an element of chance to occur at the game device is an action effected by a house person at the central station.

31. The method according to claim 27, wherein said central station includes a display for each game device; and said data processor means displays at the central station the bet placed by each player with respect to each game device, and the current account for each player.

32. The method according to claim 27, wherein said at least one game device at the central station includes a table on which the action involving an element of chance is to be effected by the house person at the central station.

33. The method according to claim 27, wherein said table is a card table for playing a card game and has a player position for each of the players to play a card game at the table; said central station including a camera for each player position of said card table, and a display for displaying the bet and current account of the player at each player position of said card table; said input means at each player station including means enabling the player thereat to input commands to the house person at the central station relating to choices made by the player in playing the card game.

34. The method according to claim 27, wherein said central station further includes an input device, operated by the house person for the respective game device at the central station, for inputting information relating to each player position of said card table.

35. The method according to claim 34, wherein said input device operated by the house person is a keyboard including a plurality of keys selectively depressible by the house person to transmit to the display of a selected player information relating to the respective player.

36. The method according to claim 34, wherein at least some of said player stations include a camera selectively energizable by the player thereat for transmitting the player's image to the display of the respective player position at the card table.

37. The method according to claim 34, wherein there is a separate display at the central station for each player position at each card table at the central casino.

38. The method according to claim 27, wherein said command input means includes a manual device for manually inputting said commands.

39. The method according to claim 38, wherein said command input means includes a microphone for voice inputting said commands.

40. The method according to claim 38, wherein said command input means includes a camera for visually inputting said commands.

41. The method according to claim 32, wherein said table is a roulette table including a roulette wheel, said roulette table being displayed in the monitor at the respective player station such that the player may place a bet thereon by the input means at the player station.

42. The method according to claim 27, wherein said plurality of betting-type game devices at the central station includes at least one in which the action involving an element of chance to occur at the selected game device is an action effected by the player at the player station.

43. The method according to claim 42, wherein said at least one game device is a slot machine to be activated remotely by the player at the player station.

44. The method according to claim 42, wherein said at least one game device is a dice game for dice to be thrown remotely by the player at the player station.

45. The method according to claim 27, wherein said central station is an actual casino which includes a plurality of different-type game devices selected by a player at a player station, including a first group of game device in which the action involving an element of chance is one effected by the player at the player station, and a second group of game device in which the action involving an element of chance is one effected by a house person at the casino; each game device further including a microphone, and each player station including a speaker enabling a player at the respective player station to hear, as well as to see, what occurs at the selected game device as it occurs at the casino.

46. The method according to claim 45, wherein said first group of game devices include slot machines, and said second group of game device include tables each having a plurality of player positions.

47. The method according to claim 45, wherein said data processor means includes: a data processor at each player station, a data processor at the casino for each game device thereat, a central data processor for all the game device at the casino, and a communication system establishing communication between all said data processors.

48. The method according to claim 45, wherein there are a plurality of said casinos connected together in a network; said data-processor means enabling the player at said player station to select both a casino, and a game device thereat, for placing a bet.

49. The method according to claim 45, wherein said communication system includes the internet communication network.

50. The method according to claim 45, wherein said communication system is a dedicated communication network using public telephone lines for communication between the casino and the player stations.

51. The method according to claim 45, wherein said plurality of player stations are at different locations.

52. The method according to claim 45, wherein said plurality of player stations are at a common location.

* * * * *